(12) United States Patent
Yang et al.

(10) Patent No.: US 12,253,401 B2
(45) Date of Patent: Mar. 18, 2025

(54) ULTRASONIC LIQUID LEVEL SENSING

(71) Applicant: InvenSense, Inc., San Jose, CA (US)

(72) Inventors: Cristabel Yang, Berkeley, CA (US);
Richard J. Przybyla, Piedmont, CA (US); Mitchell Kline, Alameda, CA (US)

(73) Assignee: InvenSense, Inc., San Jose, CA (US)

( * ) Notice: Subject to any disclaimer, the term of this patent is extended or adjusted under 35 U.S.C. 154(b) by 473 days.

(21) Appl. No.: 17/707,688

(22) Filed: Mar. 29, 2022

(65) Prior Publication Data
US 2022/0316938 A1     Oct. 6, 2022

Related U.S. Application Data

(60) Provisional application No. 63/168,075, filed on Mar. 30, 2021.

(51) Int. Cl.
    *G01F 23/2962*     (2022.01)
    *G01F 23/20*     (2006.01)
    (Continued)

(52) U.S. Cl.
    CPC ...... *G01F 23/2962* (2013.01); *G01F 23/2968* (2013.01); *G01F 25/20* (2022.01)

(58) Field of Classification Search
    CPC ............. G01F 23/2962; G01F 23/2965; G01F 23/296; G01F 23/2968; G01F 23/2966;
(Continued)

(56) References Cited

U.S. PATENT DOCUMENTS

| | | | | |
|---|---|---|---|---|
| 4,572,253 A | * | 2/1986 | Farmer | B67D 1/1238 367/908 |
| 6,082,419 A | * | 7/2000 | Skell | B67D 1/1236 141/351 |

(Continued)

FOREIGN PATENT DOCUMENTS

| | | | |
|---|---|---|---|
| CA | 2 769 211 C | 11/2012 | |
| GB | 2190495 A | * 11/1987 | ........... B06B 1/0681 |
| WO | 2016/019317 A1 | 2/2016 | |

OTHER PUBLICATIONS

International Search Report and Written Opinion in International Application No. PCT/US2022/022666, mailed Jul. 22, 2022.

*Primary Examiner* — Jeffrey P Aiello
(74) *Attorney, Agent, or Firm* — DLA Piper LLP (US)

(57) ABSTRACT

Systems and methods for ultrasonic liquid level sensing. A circuit causes an ultrasonic transducer to transmit a sequence of ultrasonic pulses and receive a sequence of reflected signals. Each reflected signal includes at least one first reflection associated with at least one non-moveable surface and at least one second reflection associated with a moveable surface. A digital controller, for each reflected signal: determines at least one of a magnitude and a variance of the respective signal to form at least one output signal, identifies, in the at least one output signal, at least one first pulse indicative of the at least one non-moveable surface and at least one second pulse indicative of the moveable surface, and determines a distance of the moveable surface relative to the at least one non-moveable surface based on the identified first and second pulses.

31 Claims, 14 Drawing Sheets

(51) Int. Cl.
*G01F 23/296* (2022.01)
*G01F 25/20* (2022.01)

(58) Field of Classification Search
CPC .............. G01F 23/2961; G01F 23/2967; G01F 23/804; G01F 23/802; G01F 23/80; G01F 25/20; G01F 25/0084; G01F 25/00; G01S 15/10; G01S 15/06; G01S 15/08; G01S 15/32; G01S 15/88; G01S 7/52004; G01S 7/521; G01S 7/52017; G01S 7/523; G01S 7/524; G01S 7/526; G01S 7/527; G01S 17/89; G01S 17/894; G01S 13/08; G01B 11/0608; G01B 11/14; G01B 11/2441; G01B 17/00; G01L 27/002; G01N 29/00; G01N 29/02; G01N 29/34; G01N 29/343
USPC ........... 73/579; 324/337; 356/601, 450, 614; 702/159, 85, 97, 152, 158, 166, 127, 1, 702/190; 703/2, 9
See application file for complete search history.

(56) References Cited

U.S. PATENT DOCUMENTS

| | | | |
|---|---|---|---|
| 8,353,321 B2 | 1/2013 | Agam et al. | |
| 8,689,624 B2 | 4/2014 | Agam et al. | |
| 8,695,646 B2* | 4/2014 | Agam ................. | G01S 15/87 |
| | | | 141/94 |
| 10,293,377 B2 | 5/2019 | Guedes et al. | |
| 10,634,544 B1 | 4/2020 | Przybyla | |
| 11,828,885 B2* | 11/2023 | Peso Parada ......... | H04B 11/00 |
| 2006/0169055 A1 | 8/2006 | Agam et al. | |
| 2010/0018309 A1 | 1/2010 | Marcovecchio et al. | |
| 2013/0228250 A1* | 9/2013 | Agam ................. | G01S 7/527 |
| | | | 141/83 |
| 2017/0184718 A1 | 6/2017 | Horsley et al. | |
| 2018/0010322 A1* | 1/2018 | Grover ................. | G01S 15/88 |
| 2019/0089468 A1 | 3/2019 | Przybyla et al. | |
| 2023/0406687 A1* | 12/2023 | Lee ................. | G05D 3/12 |

* cited by examiner

| EVENT | BASED ON | CONDITION |
|---|---|---|
| RIM DETECTED 710 | MAGNITUDE | MAGNITUDE > THRESHOLD A |
| RIM STABLE 712 | VARIANCE | VARIANCE AT RIM DISTANCE < THRESHOLD B |
| NO RIM 714 | MAGNITUDE | MAGNITUDE < THRESHOLD C |
| CUP FULL 716 | VARIANCE | FILL LEVEL > THRESHOLD D |

ULTRASONIC LIQUID LEVEL SENSING

CROSS REFERENCE TO RELATED APPLICATIONS

This application claims priority to U.S. Provisional Application No. 63/168,075, filed on Mar. 30, 2021, the entire contents of which is incorporated herein by reference.

FIELD

The present disclosure generally relates to ultrasonic pulse-echo range sensing and, more specifically, to systems and methods of ultrasonic liquid level sensing that utilize an ultrasonic sensor to automatically control dispensing of a liquid into a container.

BACKGROUND

Dispensing systems for dispensing one or more liquids (e.g., water, coffee, soft-drinks, mixed beverages, etc.) into containers are known. Liquid dispensing systems may be utilized in domestic and/or commercial applications. Dispensers may include, for example, stand-alone units (e.g., for dispensing soft-drinks, coffee, etc.) and/or may be integrated into other units (e.g., such as refrigerators, faucets, other appliances, etc.).

Some dispensers are considered to be automatic in that they may allow a user to input some type of characteristics of a container (e.g., a container size, a type of container such as a water bottle or a glass, and the like). However, conventional automatic dispensers typically rely on the user to start and/or stop dispensing of the liquid, for example by pushing some type of button and/or lever. Because conventional automatic dispensers typically involve some type of user interaction with the dispenser to control liquid dispensing, a possibility exists for germs to be transmitted from person-to-person via the dispensing system, thereby leading to an unsanitary and unsafe operating environment.

Accordingly, there is a desire to provide touchless automatic filling (i.e., control of liquid dispensing without the utilization of some user interaction), to provide an improved, sanitary operating environment. Conventional touchless dispensers exist that utilize sensor systems to automatic fill a container. However, challenges currently exist with these conventional touchless dispensers. For example, some conventional dispensers have difficulty and/or are simply unable to monitor a liquid level and adequately fill variable-sized (e.g., height and/or width) and/or variable-shaped (e.g., a uniform shape such as a cylinder, a non-uniform shape such as a tapered container, a container having a number of non-uniform surfaces such as an animal-shaped container, etc.) containers to a desired level. Moreover, conventional touchless dispensers typically utilize plural sensors on one or more areas of the dispenser and complicated processing techniques in order to provide automatic filling.

Accordingly, there is a need for touchless automatic liquid dispensers with improved liquid level sensing and dispensing control.

SUMMARY

Aspects of the present disclosure relate to systems and methods for ultrasonic liquid level sensing.

In some embodiments, an ultrasonic sensor may be utilized to automatically fill a container with a liquid. In some embodiments, the ultrasonic sensor may be provided as part of a liquid dispenser system, and may be used to detect when a container is placed under a liquid dispenser, to control the liquid dispenser to fill the container with a liquid and stop the liquid dispenser before the liquid overflows the container.

In some embodiments, a system for monitoring a moveable surface is disclosed comprising: an ultrasonic transducer; a circuit coupled to the ultrasonic transducer; and a digital controller. The circuit is configured to cause the ultrasonic transducer to transmit a sequence of ultrasonic pulses and to receive a sequence of reflected signals responsive to the transmitted sequence of ultrasonic pulses. Each of the sequence of reflected signals includes at least one first reflection and at least one second reflection. The at least one first reflection is associated with at least one non-moveable surface. The at least one second reflection is associated with the moveable surface. The digital controller is configured to, for each one of the sequence of reflected signals: determine at least one of a magnitude and a variance of the respective one of the sequence of reflected signals to form at least one output signal; identify, in the at least one output signal, at least one first pulse indicative of the at least one non-moveable surface and at least one second pulse indicative of the moveable surface; and determine a distance of the moveable surface relative to the at least one non-moveable surface based on the identified at least one first pulse and the identified at least one second pulse.

In some embodiments, the distance of the moveable surface relative to the at least one non-moveable surface is determined based on at least one first time of flight (TOF) indicated by the at least one first pulse and a second TOF indicated by the at least one second pulse.

In some embodiments, the digital controller is configured to identify the at least one second pulse indicative of the moveable surface based on the variance of the respective one of the sequence of reflected signals. In some embodiments, the digital controller is configured to determine the at least one of the magnitude and the variance based on application of at least one predefined filter. In some embodiments, the digital controller is configured to identify the at least one first pulse indicative of the at least one non-moveable surface based on the magnitude of the respective one of the sequence of reflected signals. In some embodiments, the digital controller is configured to determine a stability of the at least one non-moveable surface based on the variance of the respective one of the sequence of reflected signals.

In some embodiments, the system is configured to determine a liquid level of a liquid inside of a container, the moveable surface comprises the liquid level, and the at least one non-moveable surface comprises one or more of a rim of the container and a bottom of the container.

In some embodiments, the system is configured to determine, via the ultrasonic transducer, a background signal when the container is not present within a predetermined detection region, the background signal including a ringdown component, and the digital controller is configured to subtract the background signal from the sequence of reflected signals, to minimize the ringdown component in the sequence of reflected signals. In some embodiments, the system is configured to periodically determine the background signal. In some embodiments, the system is configured to determine one or more of the background signal and a presence of the container at a first sample rate, and to utilize a second sample rate for the received sequence of reflected signals, the first sample rate being lower than the second sample rate.

In some embodiments, prior to transmitting the sequence of ultrasonic pulses, the system is configured to detect, via the ultrasonic transducer, a presence of the container within a predetermined detection region, and to cause a dispenser to initiate dispensing of the liquid into the container responsive to the detection of the container. In some embodiments, the digital controller is configured to monitor the liquid level based on the determined distance, and to cause the dispenser to stop dispensing the liquid when the determined distance is within a predetermined threshold relative to the rim of the container.

In another aspect, a method for ultrasonic monitoring a moveable surface is disclosed. In one embodiment, a method for monitoring a moveable surface is provided, comprising: causing, via a circuit coupled to an ultrasonic transducer, the ultrasonic transducer to transmit a sequence of ultrasonic pulses; and receiving, via the circuit, a sequence of reflected signals responsive to the transmitted sequence of ultrasonic pulses. Each of the sequence of reflected signals includes at least one first reflection and at least one second reflection. The at least one first reflection is associated with at least one non-moveable surface. The at least one second reflection is associated with the moveable surface. The method further includes, for each one of the sequence of reflected signals: determining, via a digital controller, at least one of a magnitude and a variance of the respective one of the sequence of reflected signals to form at least one output signal; identifying, via the digital controller, in the at least one output signal, at least one first pulse indicative of the at least one non-moveable surface and at least one second pulse indicative of the moveable surface; and determining, via the digital controller, a distance of the moveable surface relative to the at least one non-moveable surface based on the identified at least one first pulse and the identified at least one second pulse.

In some embodiments, the distance of the moveable surface relative to the at least one non-moveable surface is determined based on at least one first time of flight (TOF) indicated by the at least one first pulse and a second TOF indicated by the at least one second pulse.

In some embodiments, the identifying of the at least one first pulse and the at least one second pulse further comprises: identifying the at least one second pulse indicative of the moveable surface based on the variance of the respective one of the sequence of reflected signals. In some embodiments, the determining of the at least one of the magnitude and the variance includes application of at least one pre-defined filter. In some embodiments, the identifying of the at least one first pulse and the at least one second pulse further comprises: identifying the at least one first pulse indicative of the at least one non-moveable surface based on the magnitude of the respective one of the sequence of reflected signals. In some embodiments, the identifying of the at least one first pulse and the at least one second pulse further comprises: determining a stability of the at least one non-moveable surface based on the variance of the respective one of the sequence of reflected signals.

In some embodiments, the moveable surface comprises a liquid level of a liquid, the at least one non-moveable surface comprises one or more of a rim of a container and a bottom of the container, the container is configured to contain the liquid, and the determining of the distance of the moveable surface relative to the at least one non-moveable surface comprises determining the liquid level of the liquid inside of the container.

In some embodiments, the method further comprises determining, via the ultrasonic transducer, a background signal when the container is not present within a predetermined detection region, the background signal including a ringdown component, and subtracting, via the digital controller, the background signal from the sequence of reflected signals, to minimize the ringdown component in the sequence of reflected signals. In some embodiments, the method further comprising periodically determining the background signal. In some embodiments, the method further comprises: determining one or more of the background signal and a presence of the container at a first sample rate; and utilizing a second sample rate for the received sequence of reflected signals, the first sample rate being lower than the second sample rate.

In some embodiments, the method further comprises, prior to transmitting the sequence of ultrasonic pulses: detecting, via the ultrasonic transducer, a presence of the container within a predetermined detection region; and causing a dispenser to initiate dispensing of the liquid into the container responsive to the detection of the container. In some embodiments, the method further comprises: monitoring, via the digital controller, the liquid level based on the determined distance; and causing the dispenser to stop dispensing the liquid when the determined distance is within a predetermined threshold relative to the rim of the container.

In another aspect, an apparatus for dispensing a liquid in a container is disclosed. In one embodiment, an apparatus for dispensing a liquid in a container comprises: a dispenser configured to dispense a liquid into a container; at least one time of flight (TOF) sensor; a circuit coupled to the at least one TOF sensor; and a digital controller. The circuit is configured to cause the at least one TOF sensor to transmit a sequence of pulses and to receive a sequence of reflected signals. Each of the sequence of reflected signals includes at least one first reflection and at least one second reflection. The at least one first reflection is associated with a portion of the container. The at least one second reflection is associated with a liquid level of the liquid dispensed into the container. The portion of the container comprises at least one of a rim and a bottom surface. The digital controller is configured to, for each one of the sequence of reflected signals: determine at least one of a magnitude and a variance of the respective one of the sequence of reflected signals to form at least one output signal; identify, in the at least one output signal, at least one first pulse indicative of the portion of the container and at least one second pulse indicative of the liquid level; and determine a distance of the liquid level relative to the portion of the container based on the identified at least one first pulse and the identified at least one second pulse. The digital controller is configured to monitor a change in the liquid level based on the determined distance over the sequence of reflected signals to control dispensing of the liquid via the dispenser.

In some embodiments, the digital controller is configured to cause the dispenser to stop dispensing the liquid when the determined distance is within a predetermined threshold relative to the rim of the container.

In some embodiments, prior to transmitting the sequence of pulses, the system is configured to detect, via the at least one TOF sensor, a presence of the container within a predetermined detection region, and to cause the dispenser to initiate dispensing of the liquid into the container responsive to the detection of the container.

In some embodiments, the system is configured to determine, via the at least one TOF sensor, a background signal when the container is not present within a predetermined detection region, the background signal including a ringdown component, and the digital controller is configured to subtract the background signal from the sequence of reflected signals, to minimize the ringdown component in the sequence of reflected signals.

In some embodiments, the digital controller is configured to identify the at least one second pulse indicative of the change of the liquid level based on the variance of the respective one of the sequence of reflected signals. In some embodiments, the digital controller is configured to at least one of: identify the at least one first pulse indicative of the portion of the container based on the magnitude of the respective one of the sequence of reflected signals, and determine a stability of the container based on the variance of the respective one of the sequence of reflected signals. In some embodiments, the at least one TOF sensor comprises at least one of an ultrasonic sensor, a radar sensor and an optical sensor.

BRIEF DESCRIPTION OF THE DRAWINGS

Examples of the touchless ultrasonic liquid dispenser and method of ultrasonic liquid level sensing are shown in the accompanying drawings.

DETAILED DESCRIPTION

Figure 1:
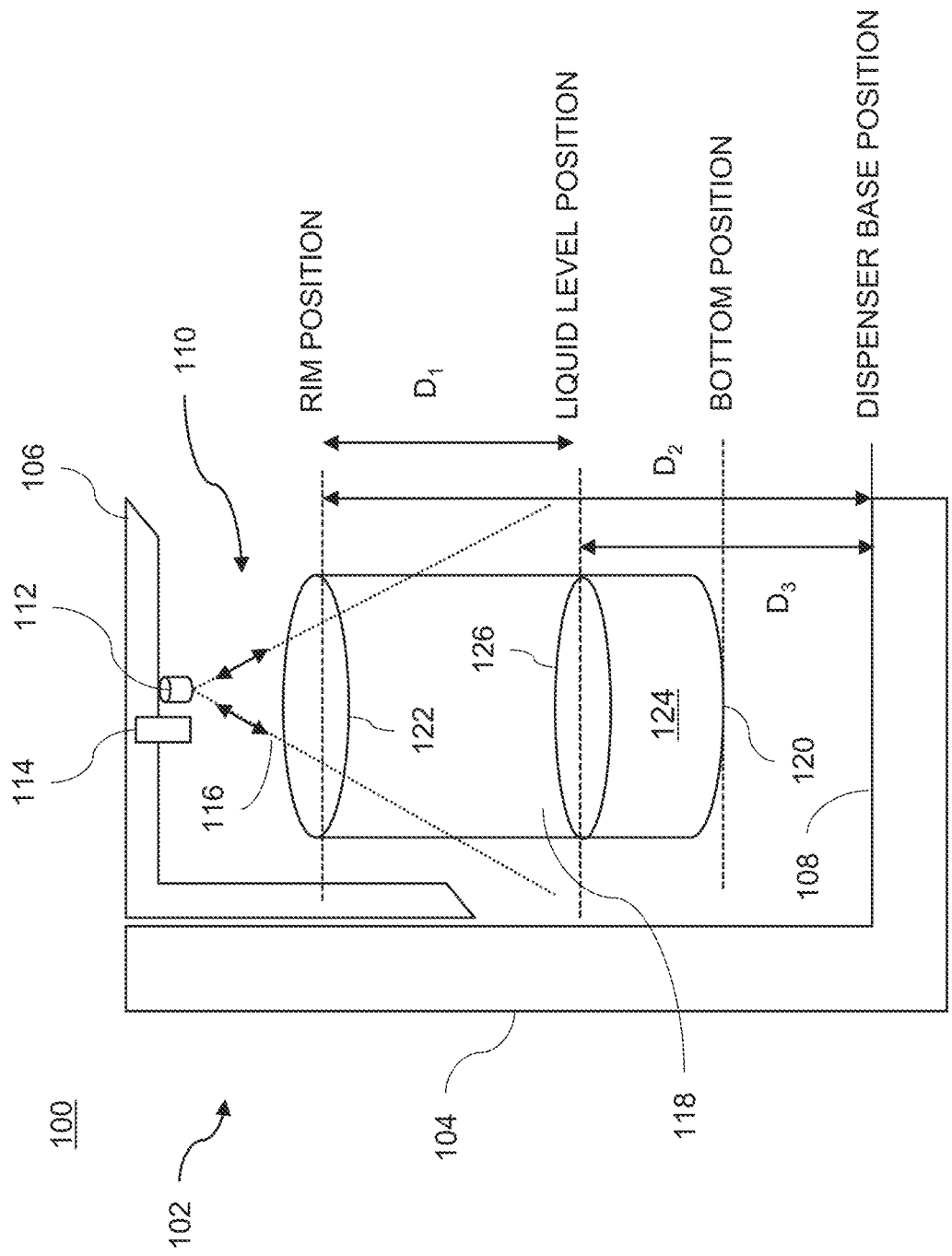
FIG. 1 is a schematic view diagram illustrating an example touchless liquid dispenser according to an aspect of the present disclosure.

Aspects of the present disclosure relate to systems and methods for ultrasonic liquid level sensing, including the use of an ultrasonic transducer (e.g., an ultrasonic sensor) for monitoring a liquid level (e.g., a moveable surface) in a container, to control automatically filling (i.e., dispensing) of the liquid into the container. As mentioned above, it is desirable to provide touchless automatic liquid dispensers that may provide an improved sanitary operation environment. It is also desirable to provide liquid level sensing solutions that may ultrasonically monitor a liquid level for variable-sized and/or variable-shaped containers, and may stop dispensing the liquid at a predetermined threshold thereby preventing the liquid from overflowing from the container. It is further desirable to provide compact and robust liquid level sensing solutions utilizing fewer ultrasonic and/or other sensors positioned on a smaller footprint of a dispenser. Accordingly, providing compact and robust ultrasonic liquid sensing for touchless automatic liquid dispensing capabilities are important.

In some embodiments, aspects of the present disclosure relate to systems and methods for monitoring a moveable surface (i.e., a liquid level). In some examples, the system may include an ultrasonic transducer, a circuit coupled to the ultrasonic transducer (e.g., a transmitter and a receiver) and a digital controller. In some examples, the circuit may be configured to cause the ultrasonic transducer to transmit a sequence of ultrasonic pulses and to receive a sequence of reflected signals responsive to the transmitted sequence of ultrasonic pulses. Each of the sequence of reflected signals may include at least one first reflection and at least one second reflection, where the first reflection(s) may be associated with at least one non-moveable surface (such as a rim of the container and/or a bottom of the container) and the at least one second reflection may be associated with the moveable surface (e.g., the liquid level in the container). In some examples, the digital controller may be configured to, for each one of the sequence of reflected signals: determine at least one of a magnitude and a variance of the respective one of the sequence to form at least one output signal; identify, in the output signal(s), at least one first pulse indicative of the non-moveable surface(s) (e.g., the rim and/or bottom) and at least one second pulse indicative of the moveable surface; and determine a distance of the moveable surface (e.g., the liquid level) relative to the non-moveable surface(s) (e.g., rim and/or bottom of the container) based on the identified first and second pulses.

In some embodiments, the system may represent a liquid dispensing system, and the reflected ultrasonic pulses from the ultrasonic sensor may be used automatically filling a container with liquid. In some embodiments, the system may also use reflected ultrasonic pulses, via the ultrasonic transducer, to detect the presence of the container and/or a stability of the container, to control initial dispensing of the liquid into the container. In some examples, the system may repeatedly monitor the liquid level during the liquid dispensing (via reflected ultrasonic pulses) and cause the dispenser to stop dispensing the liquid when the liquid level is within a predetermined threshold of the rim.

In some examples, the system may be further configured to determine a background signal representing a dispensing region of the dispenser without a container positioned in the dispensing region (also referred to herein as a predetermined detection region). The system may further be configured to subtract the background signal from the reflected ultrasonic pulses when the container is positioned within the dispensing region. In some examples, the system may be configured to periodically measure the background signal. In some examples, the system may be configured to further filter the magnitude and/or variance-processed received signal (that may form the output signal(s)). In some examples, the background signal may represent a ringdown signal.

In some examples, the magnitude-processed signal (i.e., that may form the output signal(s)) may be used to detect the rim and bottom of the container. In some examples, the variance-processed signal (i.e., that may form the output signal(s)) may be used to monitor the (changing) liquid level of the liquid in the container.

In some examples, the system may utilize a single ultrasonic transducer to detect when a container (e.g. a cup, a bottle, a bowl and the like) is placed under liquid dispenser, control the liquid dispenser to automatically fill the container to a desired fill level and stop the dispenser before the liquid overflows the container. By utilizing a single ultrasonic transducer for transmitting and receiving ultrasonic pulses to detect a moveable surface (i.e., a changing liquid level) and non-moveable surface(s) (i.e., a rim and/or bottom of a container), the system of the present disclosure provides a cost-efficient, compact and minimal footprint solution for touchless automatic liquid dispensing. This is in contrast with conventional touchless automatic dispensers that may need several ultrasonic transceivers (and/or other combinations of sensors) on various regions of a dispenser to control dispensing of a liquid into a container, and which conventional solutions may not adequately operate (or fail to operate at all) for variable-sized and/or variable-shaped containers.

Although examples of liquid level sensing and touchless automatic liquid dispensers of the present disclosure are described herein with respect to ultrasonic sensing with ultrasonic sensors, the liquid sensing and liquid dispensers are not limited to ultrasonic sensors. In general, the liquid sensing techniques and liquid dispensers of the present disclosure may utilize any suitable time of flight (TOF) sensor, including an ultrasonic sensor, an optical sensor and/or a radar sensor.

Referring next to FIG. 1, a schematic view diagram illustrating example touchless automatic liquid dispenser 100 (referred to herein as dispenser 100) is shown. Dispenser 100 may include dispenser housing 102 having main body 104 and upper portion 106. Main body 104 may include base surface 108. Main body 104 and upper portion 106 may be configured to form dispensing region 110 therein.

Upper portion 106 may be configured to include ultrasonic transducer 112 and dispenser nozzle 114. In some examples, ultrasonic transducer 112 may be positioned adjacent to dispenser nozzle 114, so that dispenser 100 may be configured to operate with containers have both smaller (e.g., bottles) and larger openings (e.g., bowls). Although FIG. 1 illustrates ultrasonic transducer 112 positioned adjacent (e.g., next to) dispenser nozzle 114, it is understood that, the position of ultrasonic transducer 112 relative to dispenser nozzle 114 is not so limited, and that, in some examples, ultrasonic transducer 112 may be spaced apart from dispenser nozzle 114 by any suitable predetermined distance.

In some examples, ultrasonic transducer 112 may include a micromachined ultrasound transducer. In some examples, ultrasonic transducer 112 may include a membrane formed over a substrate and which may be actuated using one or more of piezoelectric, capacitive and thermal actuation. In general, dimensions of ultrasonic transducer 112 (e.g., a surface area of the membrane) and/or characteristics of the ultrasonic transducer 112 (e.g., a membrane thickness, a membrane tension, a membrane material and the like) may be selected to generate ultrasonic pulses for suitable detection of container 118 and liquid level 126 within container 118. Dispenser nozzle 114 may include any suitable nozzle for dispensing liquid 124 into container 118. In some examples, ultrasonic transducer may include an acoustic horn (e.g., acoustic horn 300 shown in FIGS. 3A-3C).

Dispenser 100 may be configured so that container 118 may be placed within dispensing region 110 (e.g., a predetermined detection region). In general, container 118 may include bottom 120 and rim 122. In some examples, container 118 may be placed on base surface 108 of main body 104. In some examples, container 118 may be held by a user within dispensing region 110 (e.g., without being disposed on base surface 108). In general, container 118 may include any type of container (e.g., a cup, a bowl, a bottle, etc.) configured to hold liquid 124. Container 118 may be of any variable-size and/or variable-shape provided that container 118 may be capable of being positioned within dispensing region 110 so that liquid 124 may be directed through rim 122 into container 118.

Ultrasonic transducer 112 may be configured to transmit and receive ultrasonic pulses, depicted generally by the double-headed arrow as pulses 116. Transmitted pulses 116 may be directed towards dispensing region 110. In general, pulses 116 that are transmitted may be reflected by container 118 (when placed within dispensing region 110) and may also be reflected by liquid level 126 of liquid 124 (when container 118 contains liquid 124). In some examples, dispensing region 110 may be empty (i.e., may not include any container 118 positioned therein), and pulses 116 that are transmitted may be reflected by (container-less) dispensing region 110. When dispensing region 110 is empty of any container 118, the reflected pulses 116 may represent a background signal indicative of ringdown.

In general, a membrane of ultrasonic transducer 112 may vibrate while ultrasonic transducer 112 emits a pulse. In some examples, the membrane may continue to vibrate after the pulse is emitted for a short period thereafter, eventually decaying to zero (i.e., no) displacement. The vibration due to an emitted pulse generally has a very high amplitude and is referred to as "ringdown." The ringdown may limit the ability of ultrasonic transducer 112 to detect echoes (reflections) from close objects. This is because the ringdown signal is often orders of magnitude larger than a returning echo signal. A time period associated with ringdown for ultrasonic transducer 112 may correspond to a blind spot, which is referred to herein as a "ringdown region." The ringdown region may represent an area between ultrasonic transducer 112 and a closest distance at which an object can be detected using returned (reflected) signals that correspond to signals emitted by ultrasonic transducer 112.

In operation, ultrasonic transducer 112 may be configured to transmit and receive one or more ultrasonic pulses 116. Received pulses 116 may be used to detect a presence of container 118 in dispensing region 110. Received pulses 116 may also be used to determine a bottom position of bottom 120 and a rim position of rim 122 of container 118, when container 118 is empty (e.g., prior to dispensing of liquid 124). Once container 118 is detected, and the rim and bottom positions are known, dispensing of liquid 124 may be initiated and liquid 124 may be dispensed from dispenser nozzle 114 into container 118.

Synchronous with the dispensing of liquid 124, ultrasonic transducer 112 may be configured to transmit and receive one or more pulses 116 over time (i.e., a sequence of pulses 116 over time). The reflected pulses obtained during the dispensing of liquid 124 may be used to monitor liquid level 126 of liquid within container 118, as liquid level 126 changes (e.g., increases) over time. In some examples, dispenser 100 may determine and monitor distance $D_1$ between the rim position and the liquid level position based on the sequence of reflected pulses 116 and the determined rim position. In some examples, dispenser 100 may use additional information from distance $D_2$ (between the rim position and the dispenser base position) and/or distance $D_3$ (between the liquid level position and the dispenser base position) to monitor liquid level 126. For example, $D_2$ and/or $D_3$ may be utilized (and, in some examples, periodically measured) when container 118 being held by hand rather than disposed on base surface 108 of main body 104.

Liquid 124 may continue to be dispensed by dispenser nozzle 114 until liquid level 126 is determined to be within a predetermined threshold of rim 122 (e.g., within a predetermined threshold of the rim position). In this manner, the (changing) position of liquid level 126 relative to rim 122 (i.e., $D_1$), and in some examples, one or more of $D_2$ and $D_3$, may be used to determine when to automatically stop dispensing of liquid 124 by dispenser nozzle 114.

Further details regarding the determination of the bottom position, rim position and liquid level position are described below with respect to FIGS. 4-9C. In some examples, dispenser 100 may include dispenser system 200 (FIG. 2, described below) for controlling ultrasonic transducer 112 and dispenser nozzle 114 and for automatic detection and monitoring of liquid level 126 in container 118.

In general, dispenser 100 may be configured to provide (touchless) automatic detection of liquid level 126 in container 118 using ultrasonic transducer 112. In some examples, ultrasonic transducer 112 may represent a single ultrasonic transducer 112 that may provide automatic monitoring of liquid level 126, thereby providing a compact, cost-effective, computational efficient solution for touchless automatic liquid dispensing. Dispenser 100 may be part of a stand-alone liquid dispenser (e.g. a water dispenser) or a liquid dispenser incorporated in another device (e.g. refrigerator). Dispenser 100 may be configured for commercial and/or domestic usage. Liquid 124 that is dispensed may be of any suitable temperature. In some examples, a temperature sensor (not shown) may be included in dispenser 100 to indicate a temperature of the liquid. In some examples, dispenser 100 may include a display (e.g., display unit 228 shown in FIG. 2) to display any suitable information associated with dispensing of liquid 124 (e.g., the liquid 124 being dispensed, a fill level, a temperature, and the like). In some examples, dispenser 100 may include a user interface (e.g., user interface 230 shown in FIG. 2) for user interaction with dispenser 100 (e.g., for selecting a liquid, selecting characteristics of a liquid and the like).

Figure 2:
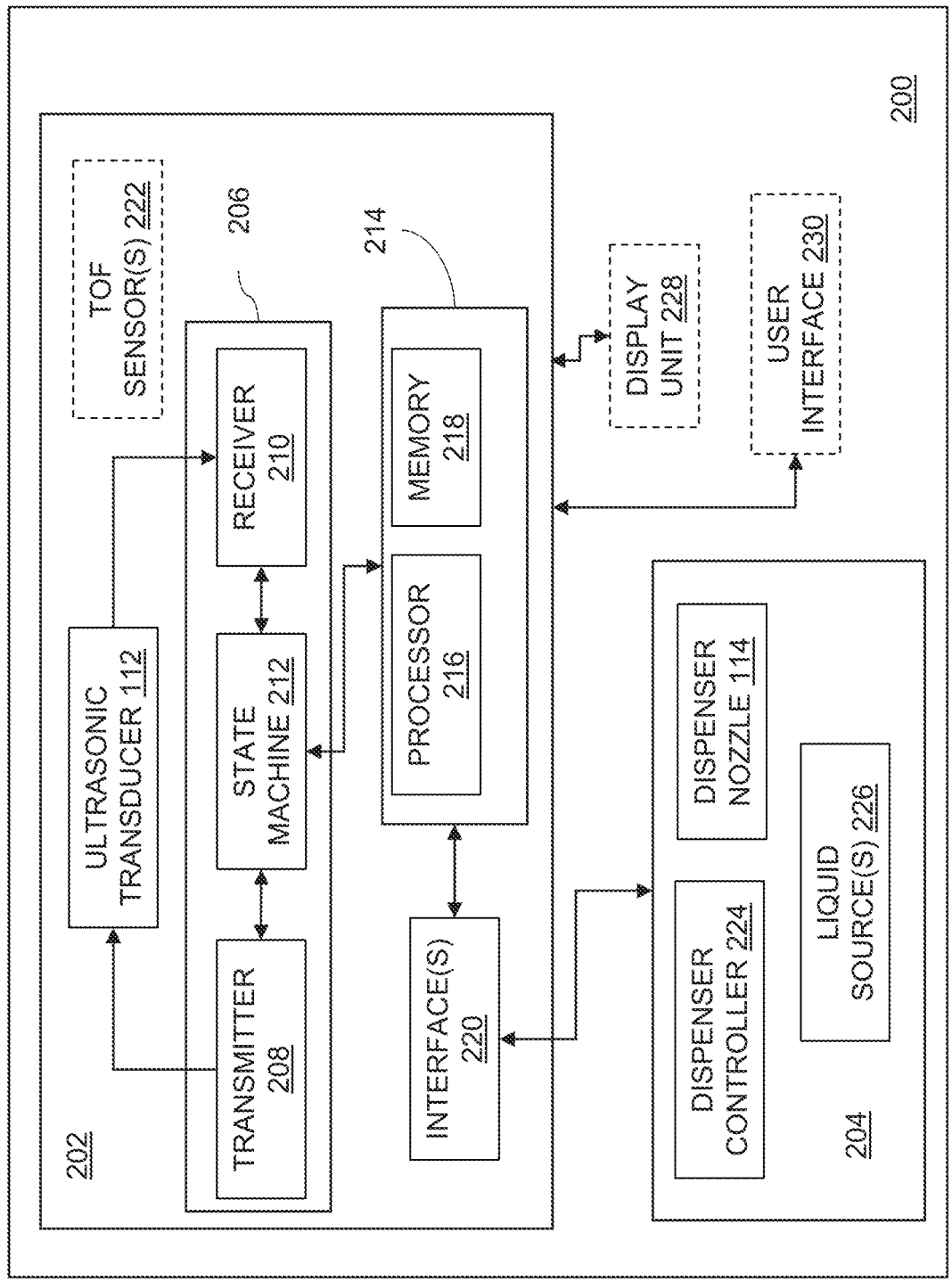
FIG. 2 is a functional block diagram illustrating an example dispenser system according to an aspect of the present disclosure.

FIG. 2 is a functional block diagram illustrating example dispenser system 200 (system 200 herein), according to an aspect of the present disclosure. System 200 may include container/liquid sensing system 202 (sensing system 202 herein) and liquid dispensing system 204. In some examples, system 200 may include one or more of optional display unit 228 and user interface 230.

Sensing system 202 may include ultrasonic transducer 112, transceiver circuit 206, central computing unit 214 and one or more interfaces 220. In some examples, sensing system 202 may include one or more optional time of flight (TOF) sensors 222. In some examples, sensing system 202 may utilize another TOF sensor instead of ultrasonic transducer 112 (e.g., an optical sensor and/or a radar sensor). In general the liquid sensing techniques (described in detail with respect to FIGS. 4-6 may also be performed with TOF sensors other than ultrasonic sensors, including with optical sensors and radar sensors. In some examples, sensing system 202 may include one or more integrated circuits, and may also contain discrete components.

Transceiver circuit 206 may include transmitter 208, receiver 210 and state machine 212. Transceiver circuit 206 may be configured to cause ultrasonic transducer 112 to transmit and receive one or more ultrasonic pulses. In some examples, and not by way of limitation, ultrasonic transducer 112 (as well as and other components of sensing system 202) may be configured as described in International Patent Application Number PCT/US2015/043256, filed Jul. 31, 2015 and published on Feb. 4, 2016 as International Application Publication WO 2016/019317, the entire contents of which are incorporated herein by reference. In some examples, and not by way of limitation, transceiver circuit 206 may be configured as described in U.S. Pat. No. 10,634,544 (the '544 patent) issued Apr. 28, 2020, the entire contents of which are incorporated herein by reference. In some examples, sensing system 202 may include one or more additional components described in the '544 patent (and incorporated herein by reference).

In some examples, transmitter 208 may include a buffer (e.g., first-in-first-out (FIFO)), an output modulator, an amplifier, a transmit switch and a programmable charge pump. The buffer may store transmit commands for controlling the output modulator to generate an output signal having a desired amplitude, phase, and duration. The amplifier (together with the transmit switch) may be configured to control the output voltage signal applied to ultrasonic transducer 112. The programmable charge pump may be configured to boost the input voltage supply level to a desired output range.

In some examples, receiver 210 may include a receive switch, a low noise receive amplifier, a receive buffer (e.g., a FIFO register, an indexed register bank), an analog to digital converter (ADC) and a mixer/filter block. The receive switch may be configured to block a high voltage transmit signal from the low noise receive amplifier. The receive buffer may hold receive commands for controlling a gain and time constant of the low noise receive amplifier and the ADC. In some embodiments, the receive buffer may be omitted. The input signal received by receiver 210 from ultrasonic transducer 112 may be respectively amplified and digitized by the low noise amplifier and the ADC. The digital output signal (from the ADC) may be quadrature demodulated and filtered by the mixer/filter block.

In some examples, state machine 212 may be configured to control transmitter 208 and receiver 210. For example, state machine 212 may control a sequencing of transmission and reception of ultrasonic signals by controlling components of transmitter 208 and receiver 210 (e.g., the transmit buffer, the output modulator, the transmit switch, the receive switch, and the receive buffer).

In some examples, state machine 212 may retrieve commands from the transmit buffer and control transmitter 208 to execute the commands for a duration specified within each command (e.g., until the transmit buffer is empty). State machine 212 may also retrieve commands from the receive buffer and control receiver 210 to execute the commands for a duration specified within each command (e.g., until the receive buffer is empty). In some examples, transmit and receive commands may be generated by control unit 214 for measuring background signal(s), detecting the presence of container 118 in dispensing region 110 and sensing and monitoring liquid level 126 in container 118.

State machine 212 may be implemented in software as a program executed on a computer processor (e.g., processor 216) or in hardware as a sequential logic circuit implemented, e.g., on an application specific controller (ASIC), field programmable gate array (FPGA), or system on chip (SoC). In some examples, state machine 212 may be capable of operating autonomously but may occasionally include interaction from central computing unit 214.

Central computing unit 214 may include at least one processor 216 and at least one non-transitory memory 218. In some examples central computing unit 214 may represent a digital controller.

In some examples, processor 216 may include, without being limited to, a microprocessor, a central processing unit, an ASIC, an FPGA, a digital signal processor (DSP), an SoC and/or a network processor. Processor 216 may be configured to execute processing logic for performing the operations described herein.

Memory 218 may include, for example, without being limited to, at least one of a read-only memory (ROM), a random access memory (RAM), a flash memory, a dynamic RAM (DRAM) and a static RAM (SRAM), storing computer-readable instructions executable by processor 216. Memory 218 may include a non-transitory computer readable storage medium storing computer-readable instructions executable by processor 216 for performing the operations described herein. In some examples, memory 218 may include a data memory and a program memory. Receiver 210 may be configured to output complex baseband data which may be stored in a data memory component of memory 218. Processor 216 may be configured to communicate with the data memory and processes the complex baseband data according to the ultrasonic sensing and liquid dispensing control algorithms described further below with respect to FIGS. 4-9C (and which algorithms may be stored as computer-readable instructions in a program memory component of memory 218).

In some examples, processor 216 may be configured to control one or more of transceiver circuit 206, liquid dispensing system 204, optional display unit 228 and optional user interface 230 via interface(s) 220. In some examples, processor 216 may be configured to receive user input via optional user interface 230. Interface(s) 220 may include any suitable interface for communications between sensing system 202, liquid dispensing system 204 and (in some examples) one or more of optional display unit 228 and optional user interface 230.

In general, sensing system 202 may utilize transmitted and reflected ultrasonic pulses (obtained via ultrasonic transducer 112) to determine a time of flight (TOF) to at least one object (e.g., container 118). The TOF may then be converted to a distance (e.g., a range) to the object based on the speed of sound. For example, transceiver circuit 206 may cause ultrasonic transducer 112 to transmit an ultrasonic pulse. An object (e.g., if one is present and within a detectable range) may be detected based on a reflected echo when the transmitted ultrasonic pulse is reflected from the object. The TOF, which is the time elapsed from transmitting the original pulse to receiving the reflected echo, may be used to detect the range of the object from ultrasonic transducer 112. Using the known value of the speed of sound, c, the range may be computed as range=TOF*c/2. The concept of determining a range to an object may be used to determine a distance between a rim of a container and a liquid level in the container, to control dispensing of a liquid into the container, by liquid dispensing system 204.

In some examples, sensing system 202 may include at least one optional TOF sensor 222 (e.g., in addition to ultrasonic transducer 112). In some examples, optional TOF sensor(s) 222 may be used to detect a presence of a container, determine a rim and/or bottom of a container (e.g., instead of ultrasonic transducer 112) and/or may be used in combination with ultrasonic transducer 112. For example, optional TOF sensor(s) 222 may be used to calibrate TOF determinations by ultrasonic transducer 112 and/or as an accuracy check to ensure that a liquid is stopped before it overflows from a container. Optional TOF sensor(s) 222 may include any suitable sensor for determining TOF values including, but not limited to, one or more of ultrasonic sensors, optical sensors and radar sensors. In some examples, optional TOF sensor(s) 222 may include an additional side-facing sensor that may be used together with ultrasonic transducer 112 to improve detection of container 118 in dispensing region 110 (e.g., to better distinguish between container versus no container detection).

Liquid dispensing system 204 may include dispenser nozzle 114, dispenser controller 224 and one or more liquid source(s) 226. Liquid source(s) 226 may include without being limited to, one or more reservoirs storing finite amount(s) of one or more liquids (e.g., water, soft drinks, coffee, etc.) and one or more continuous liquid sources (such as municipal water supply). Liquid from liquid source(s) 226 may be configured to be dispensed via dispenser nozzle 114, responsive to dispenser controller 224. Dispenser controller 224 may receive one or more commands (e.g., instructions) from sensing system 202 (via interface(s) 220). Responsive to the received commands, dispenser controller 224 may start and/or stop the flow of liquid through dispenser nozzle 114 (e.g., via control of one or more valves between liquid source(s) 226 and dispenser nozzle 114). In some examples, dispenser controller 224 may be configured to select one or more among liquid source(s) 226 (e.g., to dispense one type of liquid or a combination of liquids) based on user input via optional user interface 230.

Optional display unit 228 may be configured to display information determined by sensing system 202 to a user. For example, display unit 228 may display one or more indications related to, without being limited to, detection of a container, errors in detecting a container, container stability, errors in container stability, initiation of liquid dispensing, ending of liquid dispensing, a liquid level in the container, a remaining amount of liquid to be dispensed, an estimated time to complete liquid dispensing, a temperature of the liquid, instructions on using the dispenser and the like.

Optional user interface 230 may be configured to receive user input for one or more actions. In some examples, optional user interface 230 may be a touch screen and/or may be integrated with optional display unit 228. In some examples, optional user interface 230 may include one or more buttons and/or levers. In some examples, optional user interface 230 may allow a user to indicate one or more of, without being limited to, a type of container, a type of liquid to be dispensed, a temperature of the liquid to be dispensed, manual starting and/or stopping of the dispenser and the like.

Figure 3B:
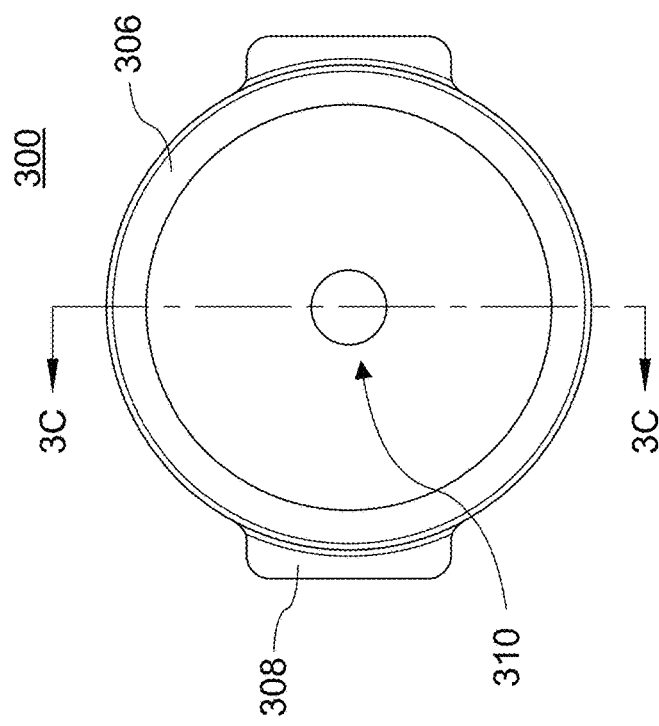
FIG. 3B is an overhead view diagram of the acoustic horn shown in FIG. 3A, according to an aspect of the present disclosure.
Figure 3A:
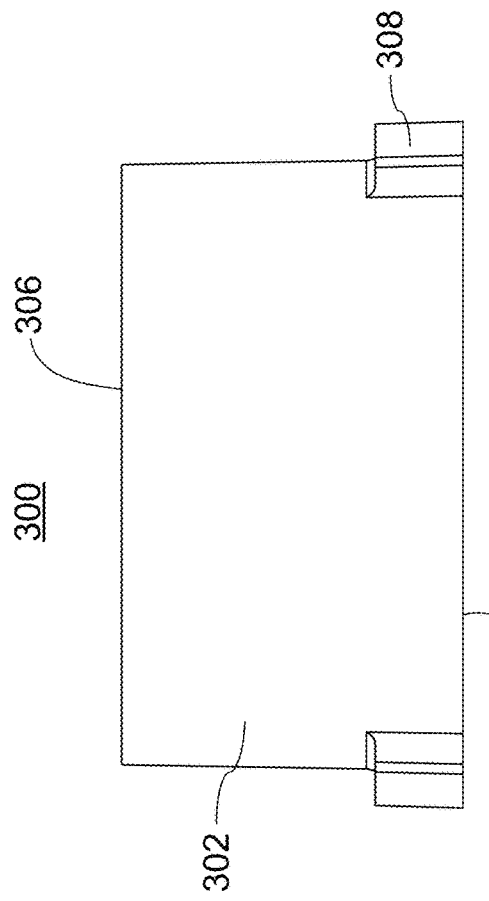
FIG. 3A is a side view diagram illustrating an example acoustic horn that may be used with an ultrasound sensor, according to an aspect of the present disclosure.
Figure 3C:
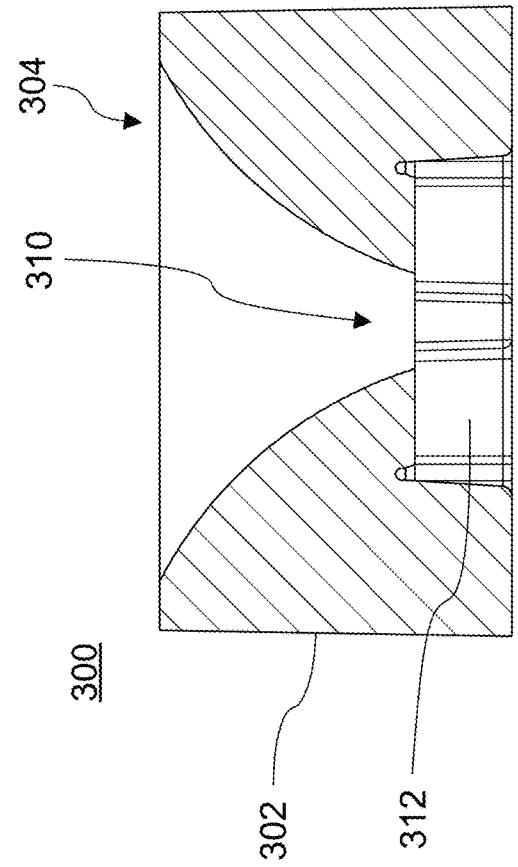
FIG. 3C is a cross-sectional view diagram taken along line 3C-3C of the acoustic horn shown in FIG. 3A, according to an aspect of the present disclosure.

Referring next to FIGS. 3A-3C, example acoustic horn 300 is shown, according to an aspect of the present disclosure. In particular, FIG. 3A is a side view diagram of acoustic horn 300; FIG. 3B is an overhead view diagram of acoustic horn 300; and FIG. 3C is a cross-sectional view diagram taken along line 3C-3C of acoustic horn 300. In some examples, ultrasonic transducer 112 (FIG. 1) may be coupled to acoustic horn 300, so that ultrasonic pulses 116 may be transmitted and received through an acoustic channel formed by acoustic horn 300.

Acoustic horn 300 may include at least one sidewall 302, base surface 304, mouth 306 and throat 310. In some examples, acoustic horn 300 may include one or more projections 308, for example, to aid in coupling base surface 304 of acoustic horn 300 to upper portion 106 (FIG. 1) of dispenser housing 102. Acoustic horn 300 may further include recess 312 configured to receive a housing of ultrasonic transducer 112 (FIG. 1).

In some examples, mouth 306 and throat 310 may both be substantially circular in shape, and mouth 306 may have a larger diameter than throat 310. In some examples, acoustic horn may have an exponential shape (e.g., an exponentially-increasing cross sectional area from throat 310 to mouth 306). It is understood that acoustic horn 300 is not limited to an exponential shape, and may include any other suitable shape, such as, without being limited to, one or more of substantially parabolic, linear, hyperbolic or conic.

As discussed above, acoustic horn 300 provides an acoustic channel for directing ultrasonic pulses 116 transmitted from ultrasonic transducer 112 towards dispensing region 110 and for capturing and guiding ultrasonic pulses 116 reflected from container 118 (liquid level 126 and/or empty dispensing region 110) to ultrasonic transducer 112. In some examples, acoustic horn 300 may be used to improve a directionality of ultrasonic transducer 112 for transmitting and receiving pulses 116 (FIG. 1). In some examples, acoustic horn 300 may increase sound energy incident on ultrasonic transducer 112 from received (reflected) pulses. In some examples, acoustic horn 300 may improve a coverage area of ultrasonic pulses 116 in dispensing region 110.

Figure 4:
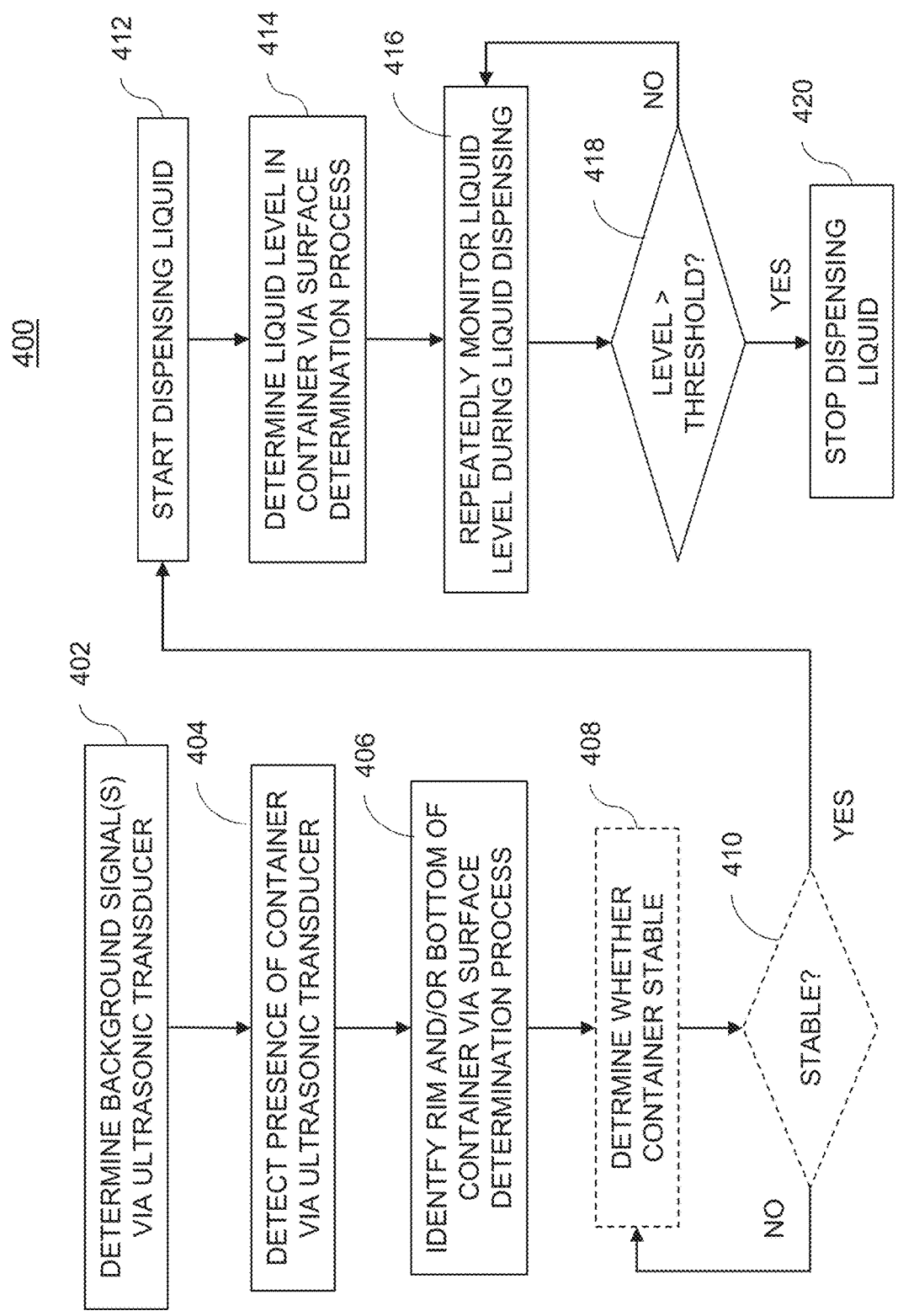
FIG. 4 is a flowchart diagram illustrating an example method for controlling dispensing of a liquid into a container, according to an aspect of the present disclosure.
Figure 8A:
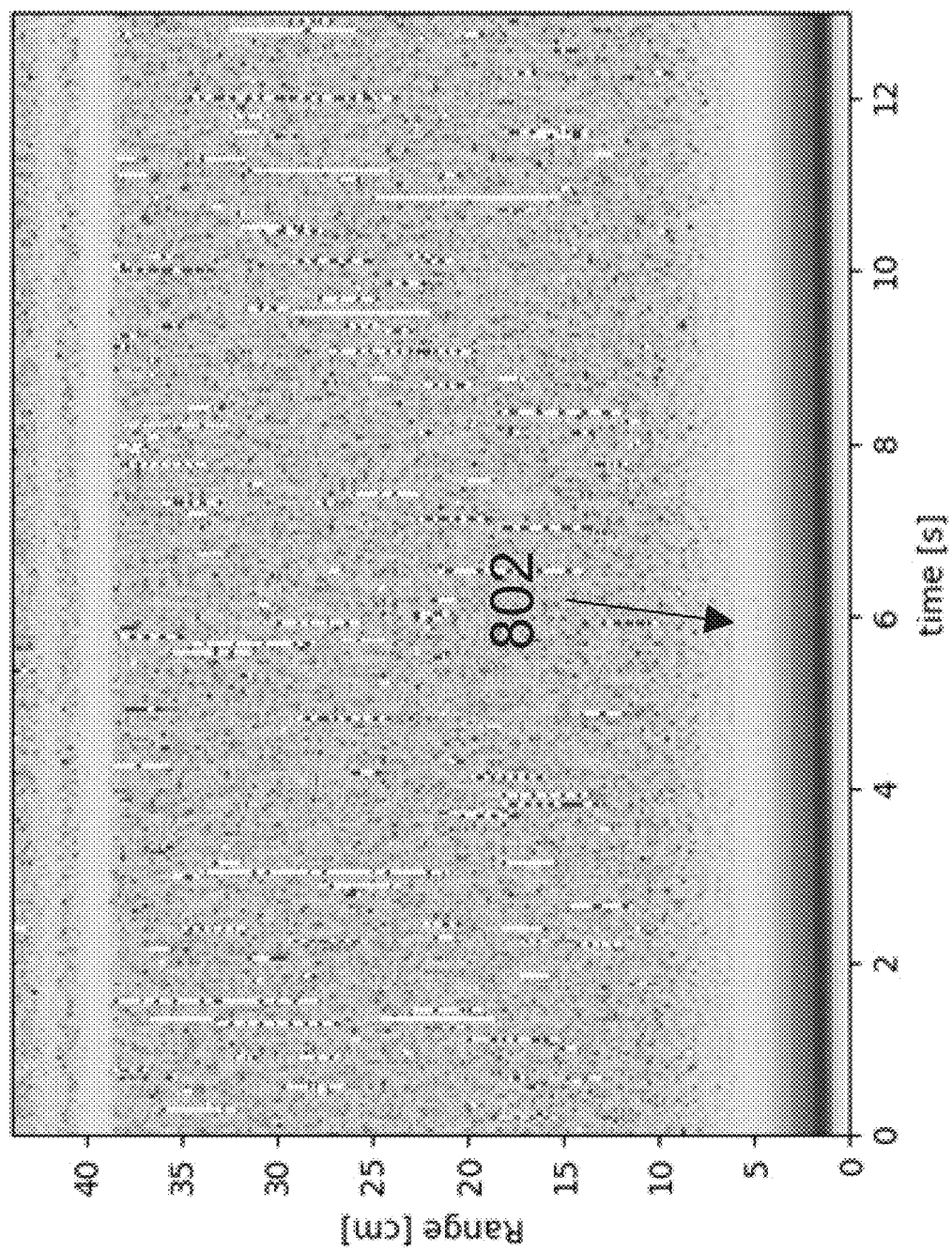
FIGS. 8A and 8B are example intensity plots of range as a function of time of ultrasonic signals reflected by an empty dispensing region (without a container being present) and by an empty container positioned in the dispensing region, respectively, according to an aspect of the present disclosure.
Figure 8B:
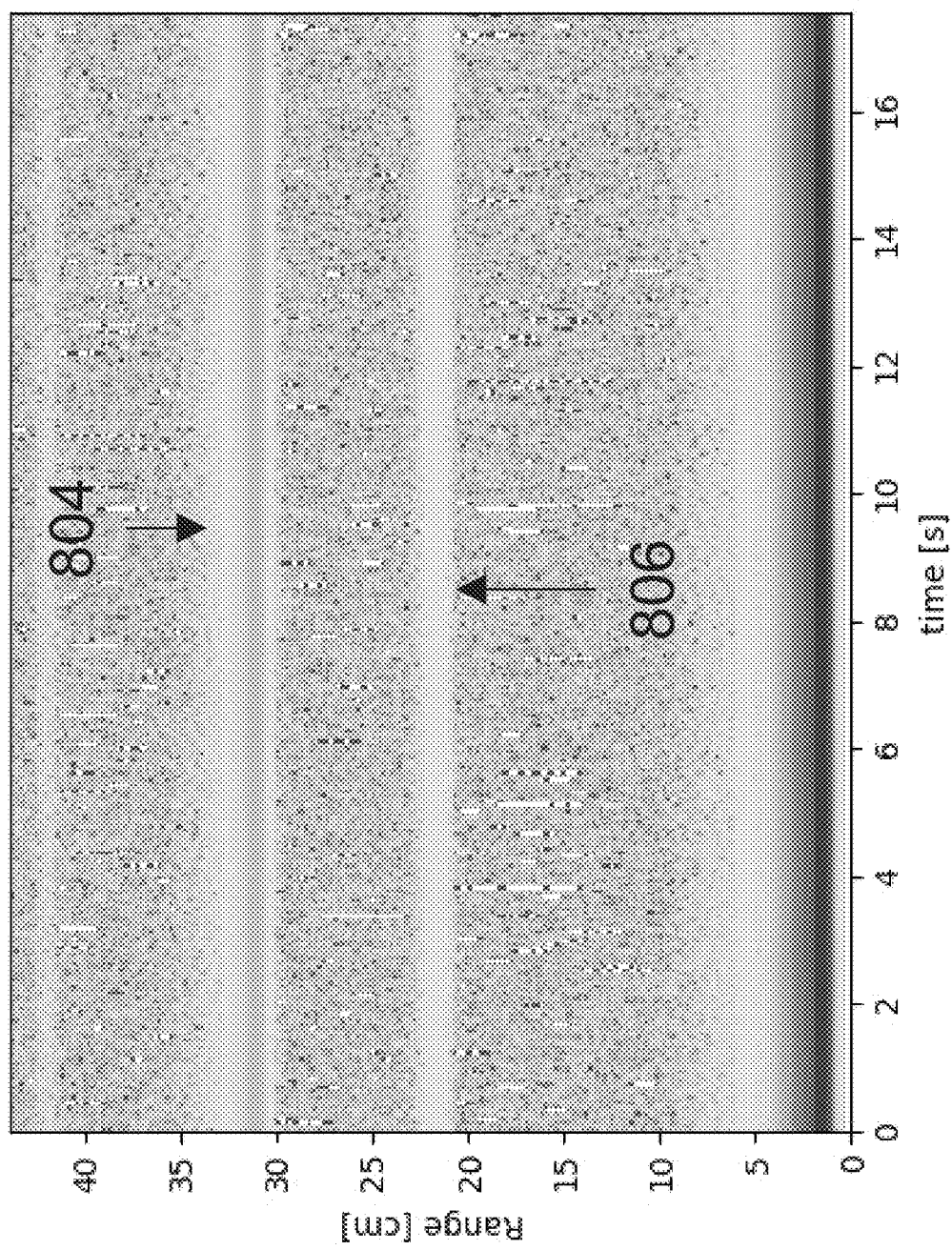
Figure 8C:
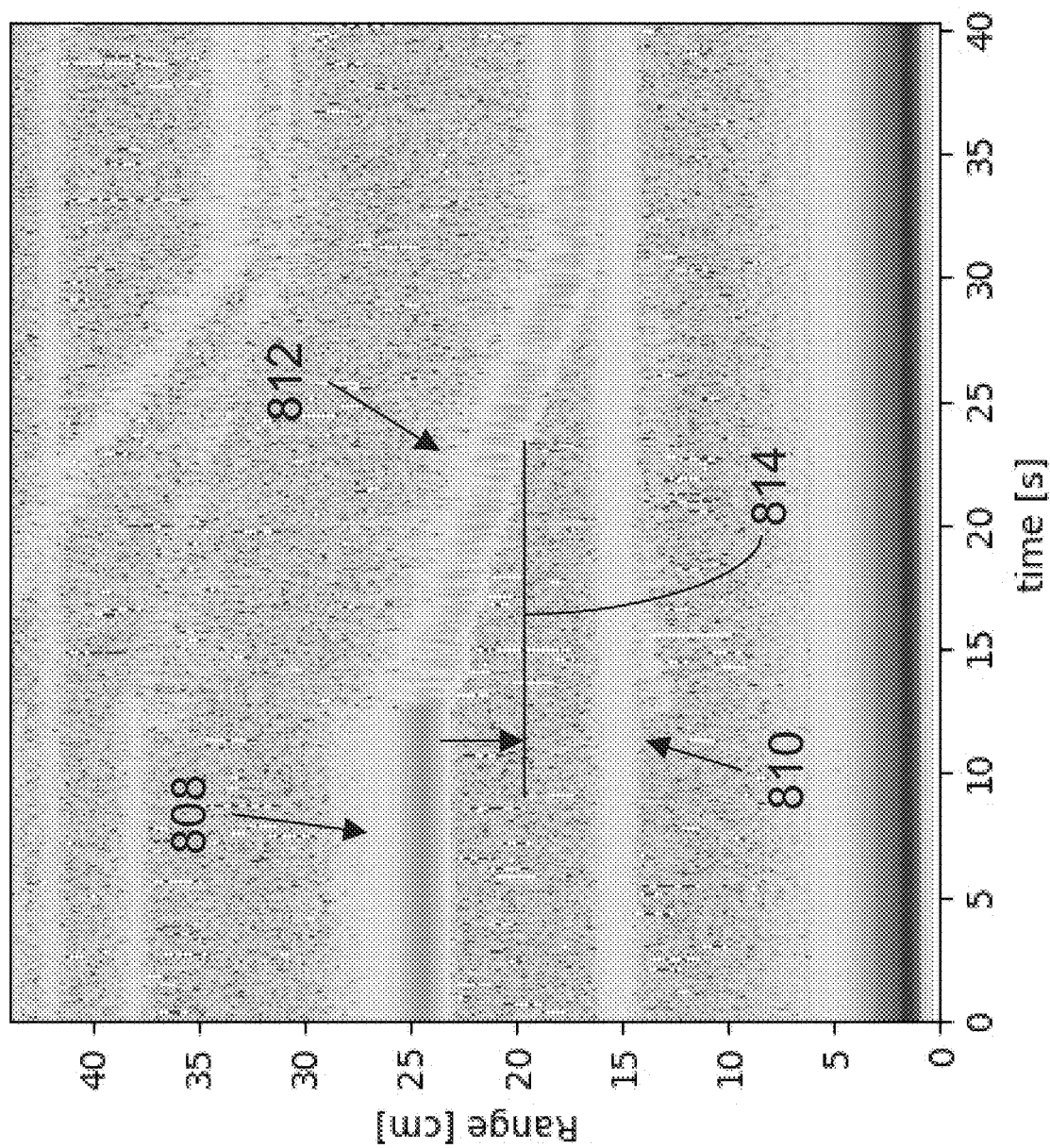
FIG. 8C is an example intensity plot of range as a function of time of magnitude-processed ultrasonic signals reflected by the container and a changing liquid level in the container, when a liquid is being dispensed into the container over time, according to an aspect of the present disclosure.
Figure 8D:
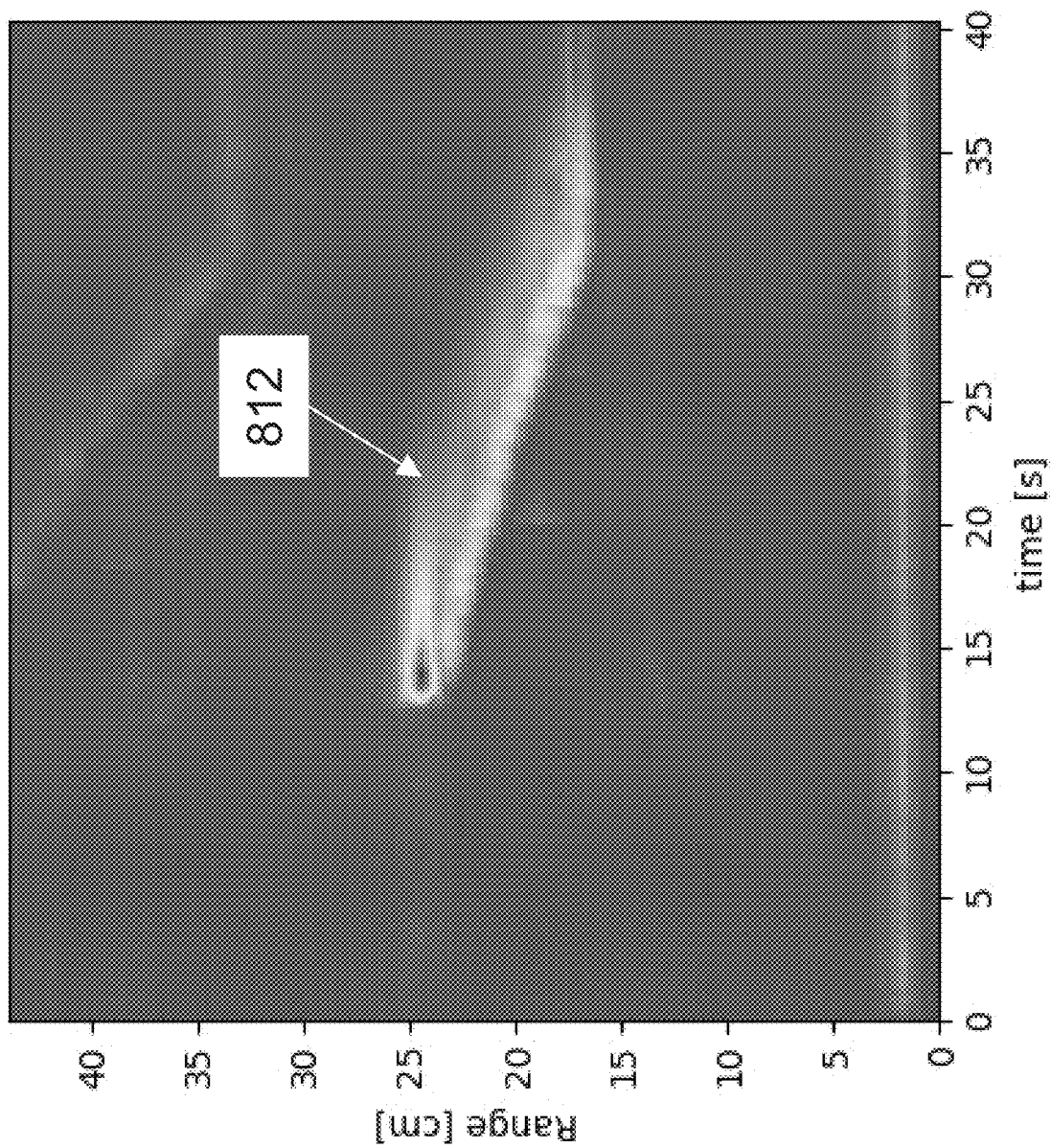
FIG. 8D is an example intensity plot of range as a function of time of variance-processed ultrasonic signals reflected by the same container having the changing liquid level shown in FIG. 8C, according to an aspect of the present disclosure.

Referring next to FIG. 4, a flowchart diagram is shown of example method 400 for controlling dispensing of a liquid into a container. Method 400 is described with respect to FIGS. 8A-8D, which provide examples of reflected (and in some examples filtered) ultrasonic pulses for various dispensing steps. In particular, FIG. 8A is an example intensity plot of range as a function of time of ultrasonic signals reflected by an empty dispensing region (without a container being present); FIG. 8B is an example intensity plot of range as a function of time of ultrasonic signals reflected by an empty container positioned in the dispensing region; FIG. 8C is an example intensity plot of range as a function of time of magnitude-processed ultrasonic signals reflected by the container and a changing liquid level in the container, when a liquid is being dispensed into the container over time; and FIG. 8D is an example intensity plot of range as a function of time of variance-processed ultrasonic signals reflected by the same container having the changing liquid level shown in FIG. 8C. In FIGS. 8A-8C, the intensity plots represent the magnitude of the received in-phase and quadrature (IQ) data, and the intensity magnitude is represented as a log amplitude. In FIG. 8D, the intensity plot represents a variance of the IQ magnitude, and the intensity of the variance is represented as a lower side band (LSB) amplitude.

At step 402, one or more background signals may be determined via ultrasonic transducer 112. For example, background signal(s) may be determined by sensing system 202 when dispensing region 110 of dispenser 100 does not include any container 118 being present therein. For example, as shown in FIG. 8A, when there is no container within dispensing region 110, ultrasonic transducer 112 may be configured to measure the background signal of the surroundings and dispenser housing 102 (e.g., dispensing region 110). FIG. 8A illustrates that a sequence of background signals measured over time mainly includes one or more reflected components (such as ringdown component 802) that does not substantially change over time. In some examples, the background signal may be periodically measured, as described below with respect to FIG. 6.

At step 404, sensing system 202 may automatically detect a presence of container 118 via ultrasonic transducer 112. For example, based on characteristics and/or a change in characteristics in a sequence of reflected ultrasonic pulses, sensing system 202 may automatically determine when container 118 is present in dispensing region 110. In some examples, sensing system 202 may further determine whether the detected container 118 is disposed on base surface 108 of dispenser housing or is being held by hand (i.e., handheld), based on the sequence of reflected ultrasonic pulses. For example, minimal changes in the characteristics of the reflected pulses may indicate that container 118 is placed directly on dispenser housing 102. In contrast a variability of the reflected ultrasonic pulses over time may indicate that container 118 is handheld. As used herein, a sequence of ultrasonic pulses may refer to at least one ultrasonic pulse associated with one instance of time or two or more ultrasonic pules associated with two or more instances of time. In some examples, the background signal detection step (step 402) and container detection step (step 404) may be determined at a lower sampling rate (e.g., about 0.5 Hz to about 5 Hz). The sampling rate may be increased once container 118 is detected (e.g. about 10 Hz to about 30 Hz).

Figure 5:
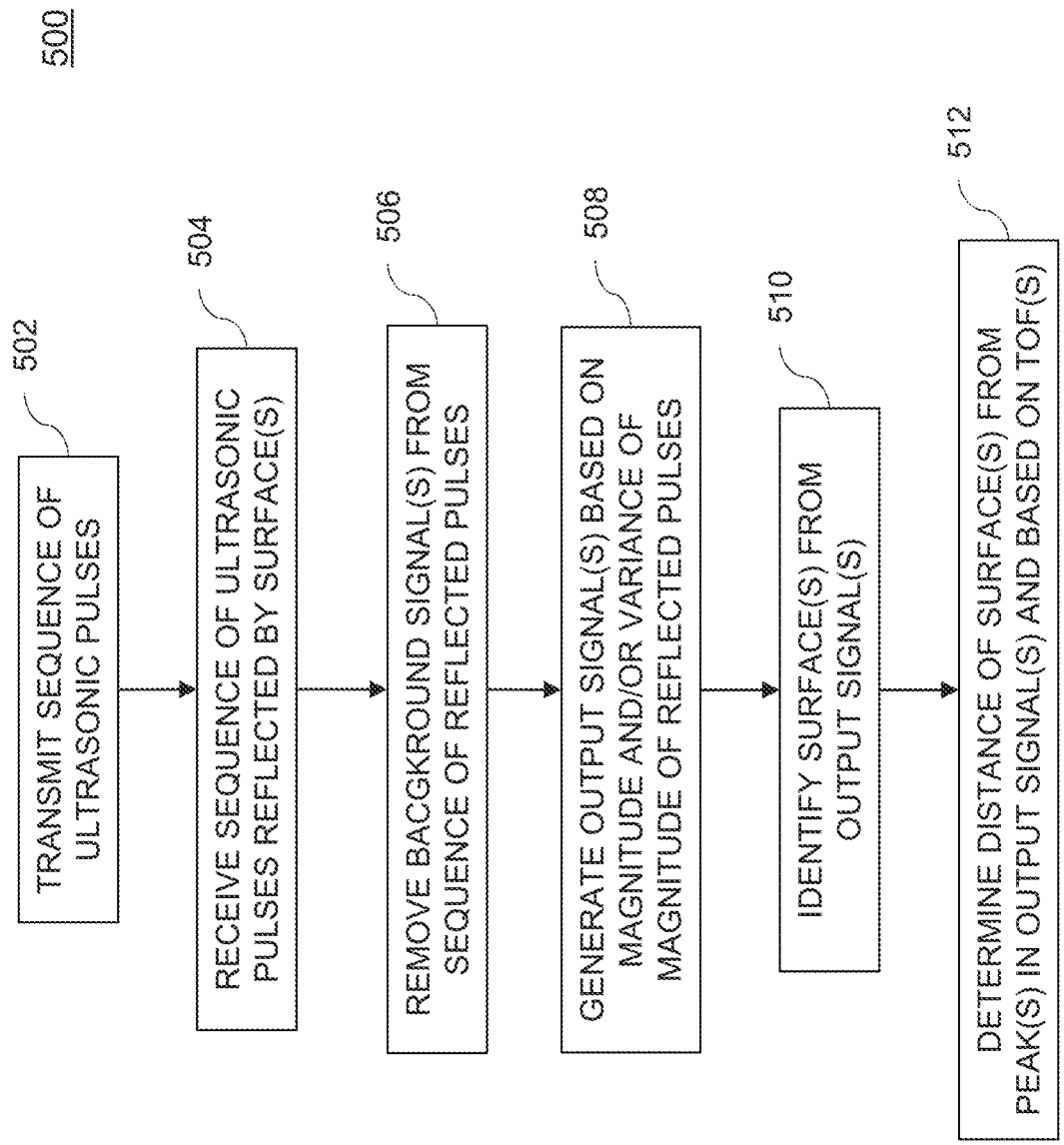
FIG. 5 is a flowchart diagram illustrating an example method for determining a distance of a surface via ultrasonic measurement, according to an aspect of the present disclosure.

At step 406, sensing system 202 may identify rim 122 and bottom 120 of container 118 based on the sequence of reflected pulses, in accordance with a surface determination process (described with respect to FIG. 5). In general, the surface determination process removes the background noise and further processes the raw ultrasonic reflected pulses to provide enhanced identification of non-moveable and/or moveable surfaces. In some examples, sensing system 202 may further determine (e.g., based on the reflected ultrasonic pulses and/or another sensor) whether container 118 is properly positioned in dispensing region 110 so that liquid 124 may be fully dispensed into container (e.g., without a portion being dispensed onto dispensing housing 102 instead). In some examples, sensing system 202, via optional display unit 228 (and/or optional user interface 230) may prompt the user to reposition container 118 in dispensing region 110. In some examples, steps 404 and 406 may be performed concurrently.

Referring to FIG. 8B, a sequence of reflected pulses over time are shown for an empty container 118 positioned within dispensing region 110. When empty container 118 is placed below ultrasonic transducer 112, the peaks over time (i.e., portions having higher magnitudes) of the reflected signals represent bottom 804 of empty container 118 and top rim 806 of empty container 118. In some examples, the range/distance (to ultrasonic transducer 112) may be determined from the TOF of the reflected signals, as described above.

At optional step 408, sensing system 202 may determine whether (empty) container 118 is stable (e.g., does not include significant movement). For example, sensing system 202 may determine whether the reflected ultrasonic signals (responsive to the surface determination process) includes any variance over time. Sensing system 202 may determine that container 118 is stable provided that the variance is less than a predetermined threshold.

When, at optional step, 410, it is determined that container 118 is not stable (e.g., a variance is greater than or equal to a predetermined threshold), step 410 may proceed to optional step 408. Optional steps 408 and 410 may be repeated until it is determined that container 118 is stable. In some examples, after a predetermined period of time, sensing system 202 may determine to prevent any dispensing action if a stability of container 118 is unable to be obtained. In some examples, sensing system 202, via optional display unit 228 (and/or optional user interface 230) may prompt the user to place container 118 on dispenser housing 102 and/or request that the user try a different container and restart the dispensing process.

When, at optional step 410, it is determined that container 118 is stable (e.g., a variance is less than the predetermined threshold), optional step 410 may proceed to step 412.

At step 412, liquid dispensing system 204 may start dispensing liquid 124 via dispenser nozzle 114. For example, responsive to step 406 (and, in some examples, optional steps 408 and 410), sensing system 202 may generate an initiation instruction and send the initiation instruction to dispenser controller 224 via interface(s) 220. Responsive to the initiation instruction, dispenser controller 224 may cause dispenser nozzle 114 to begin dispensing liquid 124 from among liquid source(s) 226. In this manner, system 200 may automatically start filling container 118 with liquid 124.

At step 414, sensing system 202 may determine liquid level 126 in container 118 based on a sequence of reflected ultrasonic pulses as processed according to the surface determination process (FIG. 5). In some examples, sensing system 202 may determine a fill level of container 118 by comparing the bottom position of bottom 120, the rim position of rim 122, and the liquid level position of liquid level 126 (See FIG. 1). In some examples, the fill level may be displayed, via optional display unit 228 and/or optional user interface 230, as feedback to the user. In some examples, steps 412 and 414 may be performed concurrently.

At step 416, sensing system 202 may repeatedly monitor liquid level 126 while liquid 124 is being dispensed, by repeatedly determining the liquid level using the sequence of reflected ultrasonic pulses (step 414) over time.

At step 418, sensing system 202 may compare the monitored liquid level (step 416) to at least one threshold. In some examples, the predetermined threshold may include, without being limited to, a predetermined distance from the rim position, the rim position itself, a predetermined percentage of fill level, and the like. In some examples, sensing system 202 may determine distance $D_1$ between the liquid level position and the rim position (FIG. 1), and use distance $D_1$ to determine when to stop filling container 118. In some examples, sensing system 202 may use both the rim position and the bottom position together with the liquid level position (FIG. 1) to determine when to stop filling container 118.

When, at step 418, it is determined that liquid level 126 is less than or equal to the predetermined threshold(s), step 418 proceeds to step 416, and steps 416 and 418 may be repeated.

When, at step 418, it is determined that liquid level 126 is greater than the predetermined threshold(s), step 418 may proceed to step 420 and dispensing of liquid 124 is stopped. For example, sensing system 202 may generate a halt instruction and send the halt instruction to dispenser controller 224 via interface(s) 220. Responsive to the halt instruction, dispenser controller 224 may prevent liquid 124 from among liquid source(s) 226 from being dispensed by dispenser nozzle 114. In this manner, system 200 may automatically stop filling container 118 with liquid 124 once a predetermined fill threshold is reached.

Thus, in step 420, system 200 may automatically stop dispensing when a predetermined threshold (e.g., an indicated/preset fill level) is obtained. In some examples, sensing system 202 may also stop the dispensing action (of liquid dispensing system 204) when sensing system 202 determines that container 118 is removed, not properly positioned or held, during any of steps 412-416. As shown in method 400, system 200 can start filling container 118 automatically after container 118 is detected and rim 122 and bottom 120 of container 118 are determined (steps 404 and 406). In some examples, sensing system 202 can also detect if container 118 is positioned or handheld, and may cause liquid dispensing system 204 to adapt dispensing (in step 412) accordingly (e.g., adjusting a speed of filing, adjusting a temperature, etc.).

Referring to FIGS. 8C and 8D, a sequence of reflected pulses over time are shown for a container that is being filled with a liquid. FIG. 8C illustrates magnitude-processed ultrasonic signals whereas FIG. 8D illustrates variance-processed ultrasonic signals. As shown best in FIG. 8C, initially the container is empty, and the magnitude processed signals indicate bottom reflection 808 and rim reflection 810 indicative of the respective bottom and rim (non-moveable surfaces) of the empty container. As can be seen in FIG. 8C, rim reflection 810 does not vary substantially over time (provided that the container does not move).

As a liquid is being dispensed, a moveable surface is created. As the liquid level changes, the distance to the liquid level (from ultrasonic transducer 112) changes, as indicated by liquid level reflection 812. Thus, over time, as liquid is being dispensed, liquid level reflection 812 starts from a level close to the bottom of the container (bottom reflection 808), and shifts towards the rim of the container (rim reflection 810.

In some examples, the changing liquid level can be determined from the magnitude-processed intensity plot of FIG. 8C, by determining the range of the changing liquid level (from liquid level reflection 812). For example, fill level 814 may be determined between the liquid level and the bottom of the container based on liquid level reflection 812 (at a particular instance of time) and bottom reflection 808 (prior to filling the container).

In some examples, a variance of the (magnitude processed) signals, as shown in FIG. 8D may be used to more clearly defined the changing liquid level, which may facilitate detecting of the changing liquid level. The variance shown in FIG. 8D enhances detection of liquid level reflection 812, while substantially minimizing bottom reflection 808 and rim reflection 810 (that do not substantially change position over time).

In some examples, the rim and bottom of the container may be detected using the magnitude-processed signals shown in FIG. 8C, by using background subtraction techniques. Because the rim and bottom of the container do not change position, the positions can be measured from bottom reflection 808 and rim reflection 810 over several instances of time using averaging. Even if the container is handheld, determination of an average may allow detection of the bottom and rim of the container. In some examples, the changing liquid level may be detected and monitored using the variance-processed signal shown in FIG. 8D.

Figure 9A:
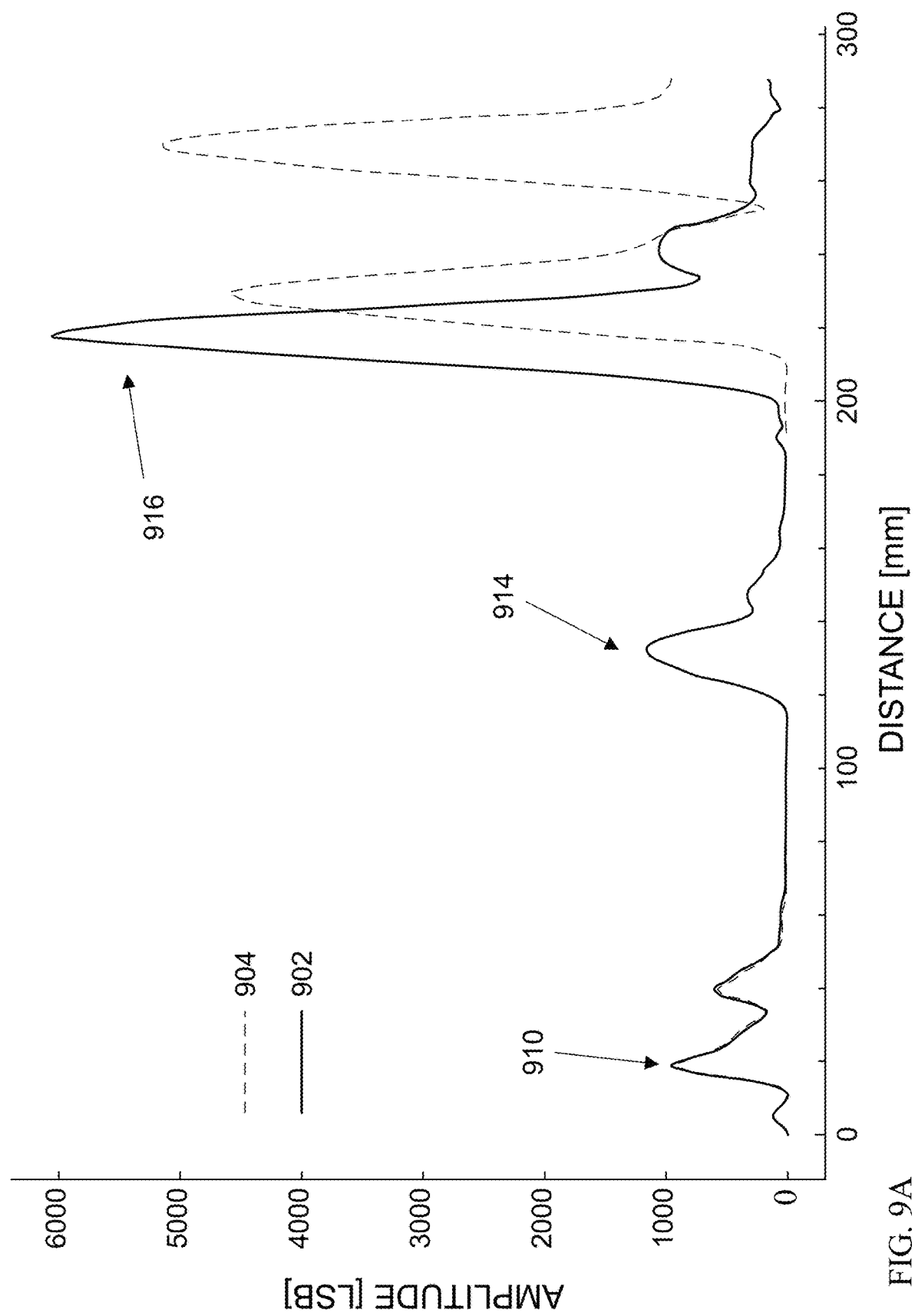
FIG. 9A is an example graph of amplitude as a function distance of raw ultrasonic reflected signals for an empty container and an empty dispenser region, according to an aspect of the present disclosure.
Figure 9B:
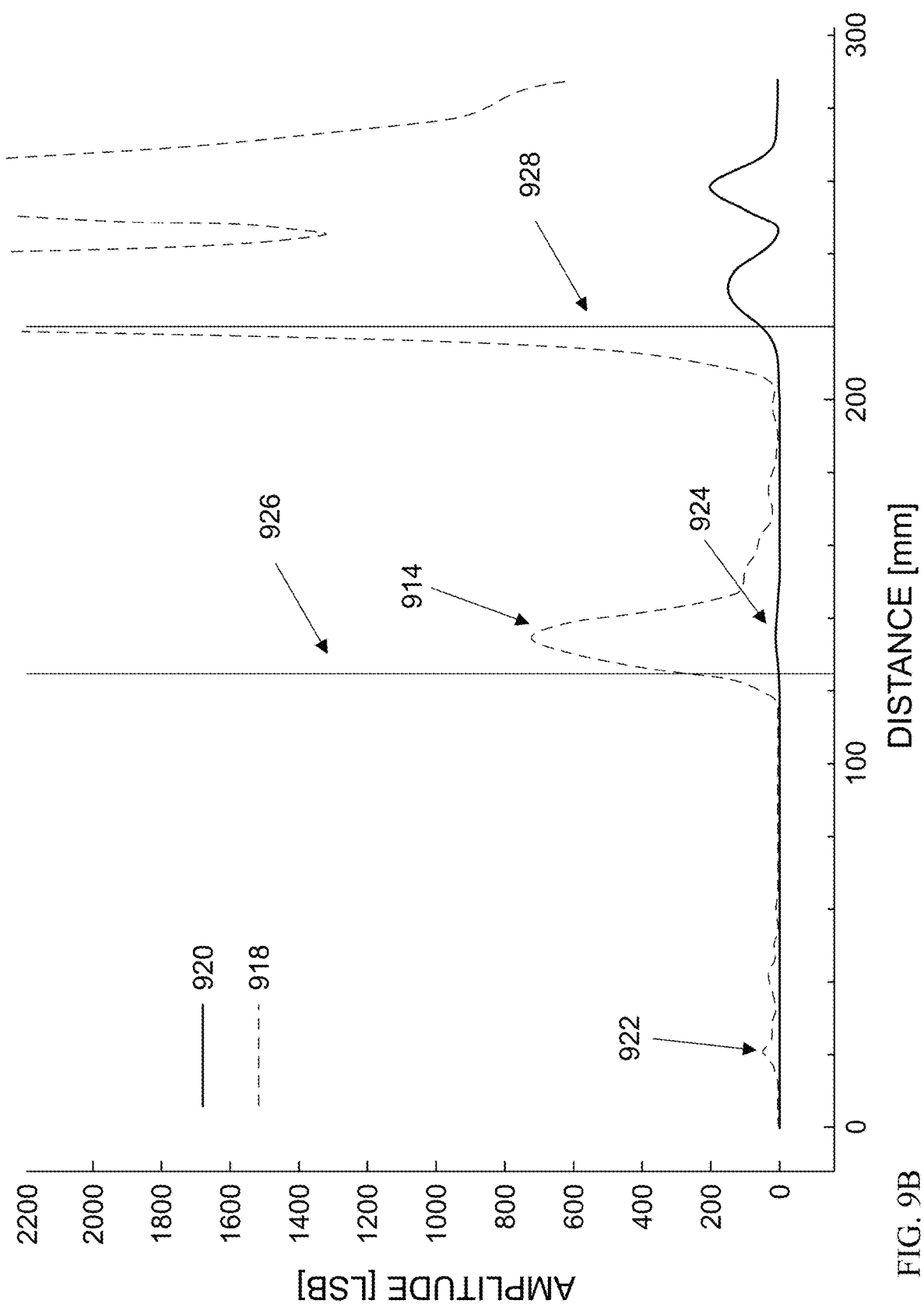
FIG. 9B is an example graph of amplitude as a function distance of filtered magnitude-processed and filtered variance-processed ultrasonic reflected signals for the empty container shown in FIG. 9A, according to an aspect of the present disclosure.
Figure 9C:
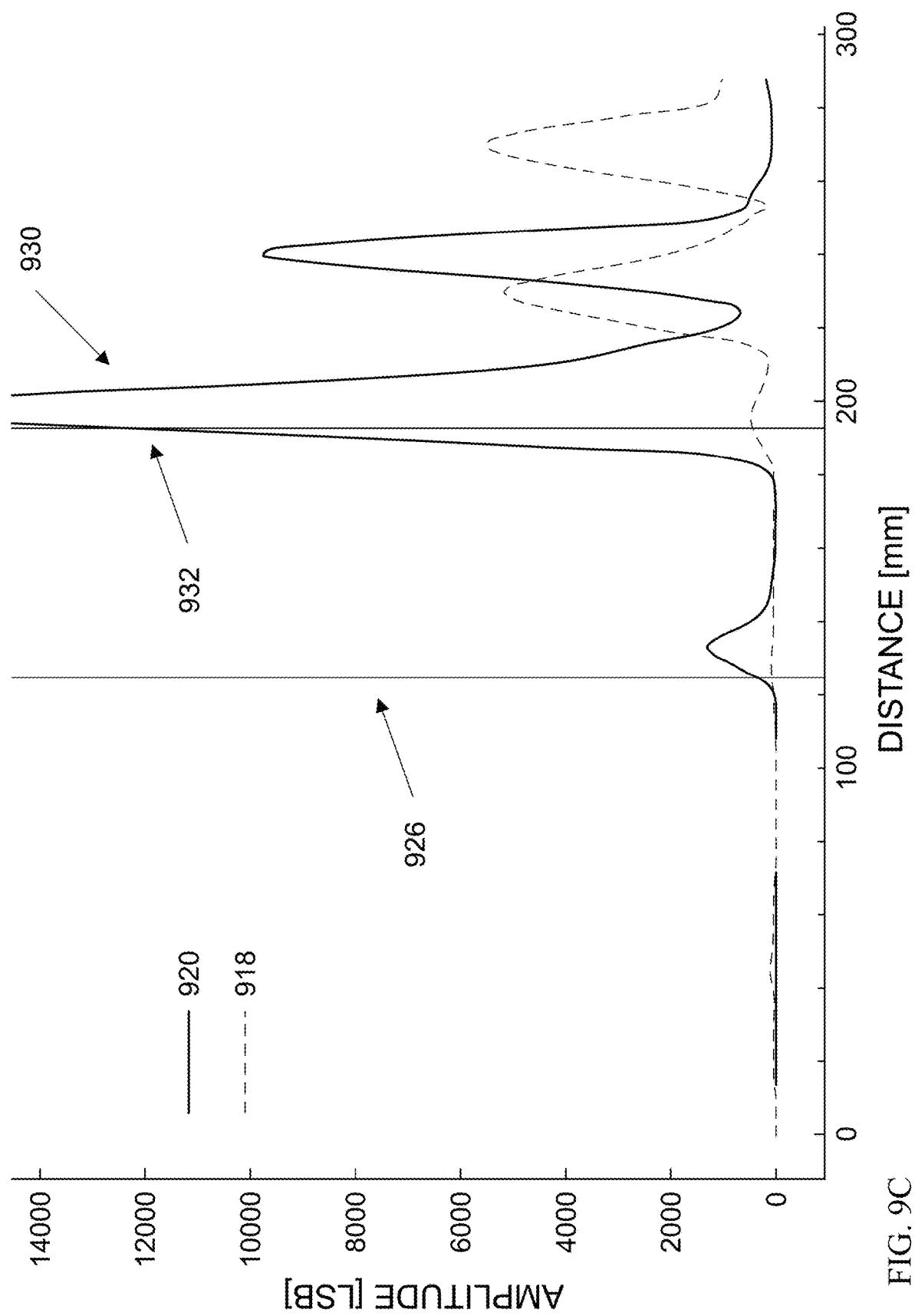
FIG. 9C is an example graph of amplitude as a function distance of filtered magnitude-processed and filtered variance-processed ultrasonic reflected signals for the container of FIGS. 9A and 9B when the container is being filled with a liquid at a particular instance of time, according to an aspect of the present disclosure.

Referring to FIG. 5, a flowchart diagram is shown of example method 500 for determining a distance of a surface (e.g., a moveable and/or non-moveable surface) via ultrasonic measurement. Method 500 is described with respect to FIGS. 9A-9C. In particular, FIG. 9A is an example graph of amplitude as a function distance of raw ultrasonic reflected signals for an empty container and an empty dispenser region; FIG. 9B is an example graph of amplitude as a function distance of filtered magnitude-processed and filtered variance-processed ultrasonic reflected signals for the empty container shown in FIG. 9A; and FIG. 9C is an example graph of amplitude as a function distance of filtered magnitude-processed and filtered variance-processed ultrasonic reflected signals for the container of FIGS. 9A and 9B when the container is being filled with a liquid at a particular instance of time. In FIGS. 9A-9C the resulting signals are shown as an amplitude (for lower side band (LSB) modulation) as a function of distance (mm).

At step 502, a sequence of ultrasonic pulses may be transmitted by ultrasonic transducer 112. For example, transceiver circuit 206 may cause ultrasonic transducer 112 to transit a sequence of ultrasonic pulses 116 towards dispensing region 110. At step 504, a sequence of ultrasonic pulses reflected by at least one surface (moveable and/or non-moveable) may be received. For example, transceiver circuit 206 may cause ultrasonic transducer 112 to receive a sequence of ultrasonic pulses 116 reflected from non-moveable surface(s) (e.g. bottom surface 120 of container 118, rim 122 of container 118) and/or a moveable surface (e.g., liquid level 126 of liquid 124 in container 118). In some examples, the received sequence of reflected pulses (step 504) may be stored in memory 218.

At step 506, at least one background signal (determined in step 402) may be removed from the (received) sequence of reflected pulses (step 504). For example, processor 216 of sensing system 202 may use one or more background subtraction techniques to remove background signal(s) from the sequence of reflected pulses. In a non-limiting example, ringdown may be subtracted from a current signal in the in-phase and quadrature (IQ) domain. The resulting signal may be passed to a magnitude filter to form a filtered magnitude signal. For example, IQ data (e.g., the background signal captured at step 610 in FIG. 6) may be stored (e.g., in memory 218 of FIG. 2). The stored IQ data (the background signal) may be subtracted from the current signal in the IQ domain, with the in-phase (I) component and quadrature (Q) components handled separately. In this manner, the I-component of the background signal may be subtracted from the I-component of the current signal, and the Q-component of the background signal may be subtracted from the Q-component of the current signal. In some examples, the background subtraction may be performed in the magnitude domain, where the magnitude of the background signal may be subtracted from the magnitude of the current signal.

At step 508, a sequence of output signal(s) may be generated based on magnitude and/or variance-processing of the sequence of (noise-processed) reflected signals. In some examples, the magnitude/variance-processing may include applying one or more filters to the sequence of (noise-processed) reflected signals (determined in step 506). Examples of computation of the filtered magnitude and variance are described below.

At step 510, at least one surface may be identified from one or more output signal(s) among the sequence of output signal(s). In general each output signal (having reflections from at least one surface) may include one or more peaks indicative of the surface(s). A surface may be identified from the peak(s) in the output signal(s). In some examples, peak(s) in a magnitude-processed (and, in some examples, filtered) output signal may be identified that are indicative of a rim and bottom of a container. Peak(s) in a variance-processed (and, in some examples, filtered) output signal may be identified that are indicative of a changing liquid level of liquid in the container. At step 512, a distance (e.g., a range) of the identified surface(s) may be determined from the corresponding peak(s) in the output signal(s), based on a conversion of (TOF) values to range values (as discussed above).

FIG. 9A illustrates raw ultrasonic reflected signals for an empty dispensing region 110 (a background signal) and an empty container in dispensing region 110. In FIG. 9A, signal 902 represents a raw magnitude of at least one reflected ultrasonic pulse (at a particular instance in time); and signal 904 represents a measured ringdown signal (a background signal). FIG. 9A illustrates an example of typical raw received data when a container is positioned below ultrasonic transducer 112.

FIG. 9A also illustrates ringdown indication 910, peak 914 indicative of reflection from rim 122 of container 118 (referred to herein as rim peak 914) and peak 916 indicative of reflection from bottom 120 of container 118 (referred to herein as bottom peak 916).

FIG. 9B illustrates magnitude and variance (reflected ultrasonic pulse) data for the container 118 after filtering the data shown in FIG. 9A. In FIG. 9B, signal 918 represents the filtered magnitude and signal 920 represents the filtered variance. FIG. 9B also illustrates peak 922 representing substantially canceled ringdown, signal portion 924 representing a variance of the rim, detected rim distance 926 and detected bottom distance 928.

As shown in FIG. 9B, filtered magnitude signal 918 produces a strong peak indicative of rim 122. In contrast, signal portion 924 (associated with rim 122) produces a low rim variance, indicating that a position of rim 122 does not change significantly. Accordingly, the filtered variance signal 920 may be used to detect and monitor the changing liquid level (as indicated by detected liquid level), due to the large peak generated by the changing liquid level (as shown in FIG. 9C), while minimizing false identification of rim peak 914 as the liquid level. This is because rim portion 924 of rim 122 is significantly reduced in variance signal 920 compared to magnitude signal 918.

FIG. 9C illustrates filtered magnitude and variance (reflected ultrasonic pulse) data for the container 118 during liquid dispensing. In FIG. 9C, signal 918 represents the filtered magnitude and signal 920 represents the filtered variance. FIG. 9C also illustrates detected rim distance 926 and detected liquid level distance 932. FIG. 9C illustrate a large variance (signal 920) due to the moving liquid (indicated by large peak 930). When liquid 124 flows into container 118, a large variance in the raw magnitude data may be observed. Signal 920 represents the variance of the magnitude data (signal 918) at each distance point. The liquid level distance 932 may be found as the leading edge of the large variance pulse 930.

A non-limiting example is next provided for determining filtered magnitude and variance signals (example output signals that may be determined at step 508).

In some examples, a filtered magnitude signal ("filt_mag") may be determined as follows. The filtered magnitude signal may be first initialized with an initial magnitude value ("mag" or zero). The magnitude signal may be applied to a filter (an example of which is shown in the below pseudocode). A scaling factor ("alpha") for the filter may be selected that may be a value between 0 and 1. The filter can either be applied to IQ-domain sensor data (one filter for the in-phase (I) component, one filter for the quadrature (Q) component) or to magnitude data, where the magnitude may be determined with sqrt(I^2+Q^2), where "sqrt" represents the square root function. When the filter is applied to the IQ-domain sensor data, the magnitude may be determined after the filtering operation.

The pseudo code below represents an example determination of the filtered magnitude signal:

```
def update_filt_mag(mag, filt_mag, alpha):
    for (x, y) in (mag, filt_mag):
        y = alpha * x + (1 - alpha) * y.
```

The filtered variance signal ("filt_var") may be determined as follows. Similar to the filtered magnitude signal, the filtered variance signal may be first initialized appropriately (e.g., to zero). The scaling factor ("alpha") may represent a value from 0 to 1 that controls the amount of filtering of the magnitude data. The scaling factor ("alpha_var") represents a value between 0 and 1 that may control the amount of filtering of the variance signal. The variance signal filter may determine the square difference ("sq-diff") between the current magnitude and the time-averaged magnitude.

The pseudo code below represents an example determination of the filtered variance signal:

```
update_filt_mag(mag, filt_mag, alpha)
sq_diff = mag^2 - filt_mag^2 # subtracted element by element
update_filt_mag(sq_diff, filt_var, alpha_var).
```

The filtered magnitude signal and filtered variance signal may then be compared to one or more thresholds, to determine the rim and liquid level. For example, the pseudo code for the filtered magnitude signal may include additional pseudo code for update_rim_signal (e.g., to determine the rim from the filtered magnitude based on at least one threshold). The pseudo code for the filtered variance signal may include additional pseudo code for liquid_signal (e.g., to determine the liquid level from the filtered variance).

Figure 6:
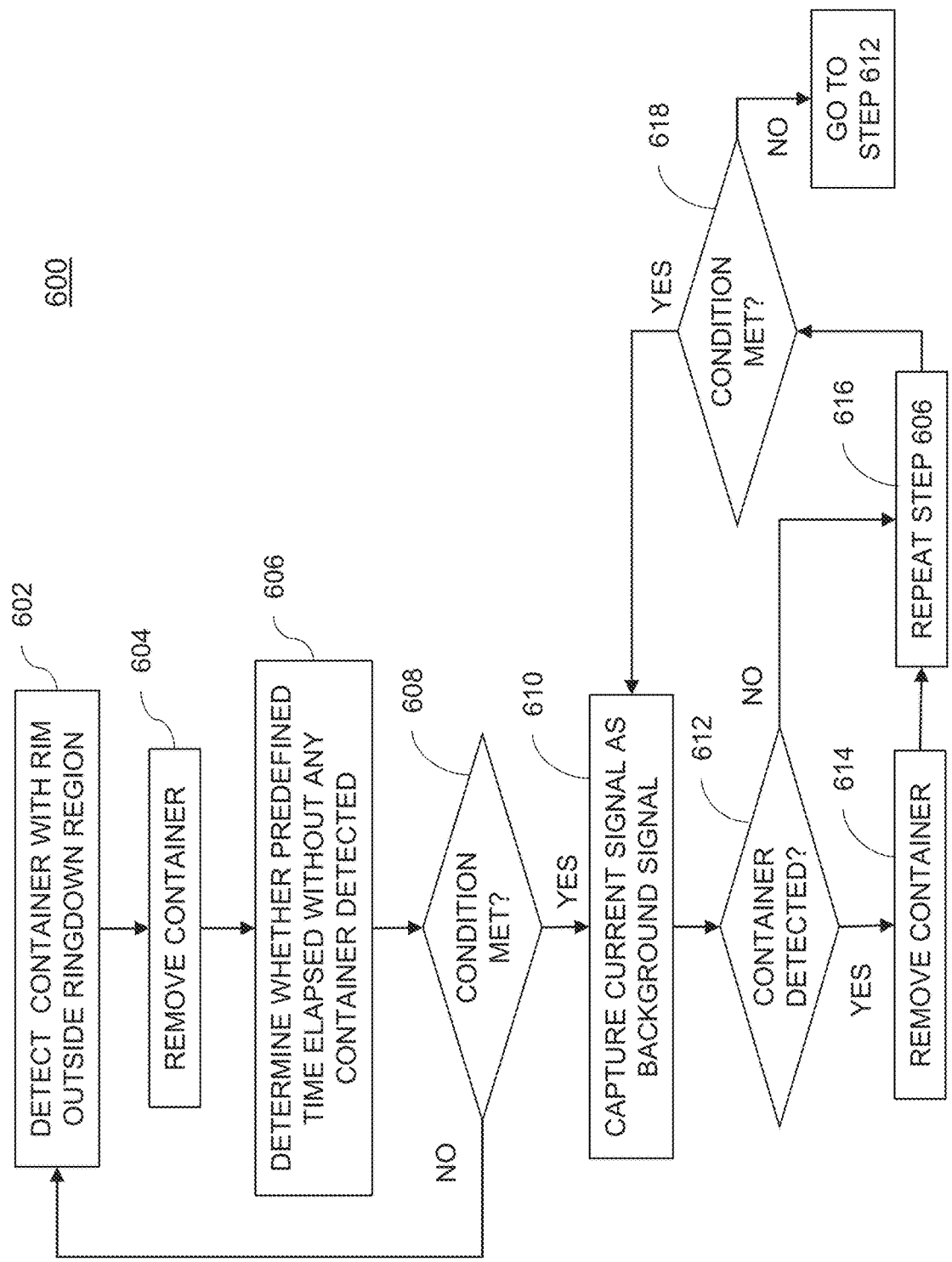
FIG. 6 is a flowchart diagram illustrating an example method for calibration of a background signal, according to an aspect of the present disclosure.

Referring next to FIG. 6, a flowchart diagram is shown of example method 600 for calibration of a background signal, according to an aspect of the present disclosure. In some examples, the background signal may be periodically sampled in order to ensure the background signal is accurate. For example, the background signal may change over time due to temperature, power cycling, etc.).

As part of the calibration, it is desirable to sample the background signal when there is no container placed within the field of view. The background signal may impact the ability to detect container rims and liquid levels close to ultrasonic transducer 112. The region close to ultrasound transducer 112 is known as the "ringdown region". It may be desirable to detect a container outside the ringdown region at least once for a suitable calibration. This may occur at somewhat regular intervals during sensor operation. After an initial calibration, it may be possible to run the calibration again after 'any' container is detected and removed.

At step 602, a container may be detected having a rim outside of the ringdown region. At step 604, the container may be removed. At step 606, sensing system 202 may determine whether a predefined time has elapsed (e.g., about 5 seconds) since the container is removed (referred to herein as the condition). At step 608, it is determined whether the condition (step 606) has been met. When the condition fails to be met, step 608 may proceed to step 602.

When the condition is met, step 608 may proceed to step 610. At step 610, a current signal may be captured via ultrasonic transducer 112, and the current signal may be defined as the background signal. At step 612, it is determined whether a container is detected within the ringdown region.

When it is determined, by sensing system 202, that a container is detected, step 612 proceeds to step 614. At step 614, the container may be removed, and step 614 may proceed to step 616. At step 616, step 606 may be repeated and step 616 may proceed to step 618.

When it is determined, by sensing system 202, that a container is not detected, step 612 may proceeds to step 616. At step 616, step 606 may be repeated and step 616 may proceed to step 618.

When it is determined at step 618, that the condition (in step 606) is met step 618 may proceed to step 610, and a new signal may be captured as the background signal. When it is determined, at step 618 that the condition is not met, step 618 may proceed to step 612. In this manner, a background signal may be periodically determined and updated, to reflect the most up-to-date operating conditions for ultrasound transducer 112.

Figures 7A, 7B:
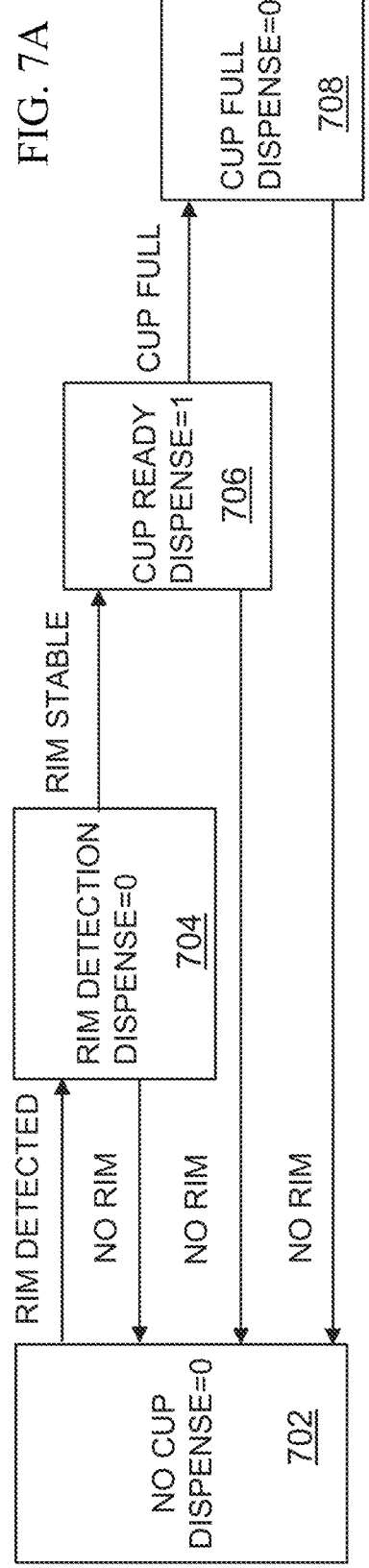
FIG. 7A is a state diagram illustrating example states for controlling dispensing of a liquid into a container, according to an aspect of the present disclosure.
FIG. 7B is a table illustrating example events associated with the state diagram shown in FIG. 7A, according to an aspect of the present disclosure.

Referring next to FIGS. 7A and 7B, an example process is shown for controlling dispensing of a liquid into a container (e.g., a cup). In particular, FIG. 7A is state diagram 700 illustrating example states for controlling dispensing of a liquid into a container (e.g., a cup); and FIG. 7B is a table illustrating example events associated with state diagram 700. In some examples, state diagram 700 may be implemented by processor 216 and the table shown in FIG. 7B may be stored in memory 218. In some examples, state diagram 700 may be used by processor 216 to generate instructions to dispenser controller 224. Although FIGS. 7A and 7B illustrate controlling dispensing into a cup, it is understood that a cup represents a non-limiting example of a container.

In the table shown in FIG. 7B, events 710-716 may be determined from processing one or more reflected ultrasonic signals to generate filtered magnitude and variance signals (see "based on" column), also referred to as the output signals throughout the present disclosure. A condition for triggering one of events 710-716 may depend on various thresholds (A-D) and a particular output signal (e.g., the filtered magnitude signal, the filtered variance signal). State diagram 700 assumes that a sequence of reflected ultrasonic pulses are measured and processed and filtered (as in method 500 shown in FIG. 5) over the various states 702-708.

At state 702 (no cup, dispense=0), processor 216 may determine that no cup (e.g., an example of container 118) is positioned within dispensing region 110, for example based on characteristics of received reflected ultrasonic pulses 116. While in state 702, processor 216 may identify that event 710 (rim detected) has occurred. For example, the rim may be detected from a peak of the filtered magnitude signal when the magnitude (of the peak) is greater than predetermined threshold A. When event 710 is determined to occur, state 702 may proceed to state 704.

At state 704 (rim detection, dispense=0), processor 216 may determine that one of event 712 (rim stable) and event 714 (no rim) has occurred. For example, event 712 may be determined to occur when the filtered variance signal at the rim distance (determined in event 710) is less than predetermined threshold B. Event 714 may be determined to occur when the filtered magnitude signal is less than a predetermined threshold C (e.g., at the rim distance determined in event 710).

When event 712 is determined to occur, state 704 may proceed to state 706. When event 714 is determined to occur, state 704 may proceed to state 702 (no cup, dispense=0).

At state 706 (cup ready, dispense=1), processor 216 may instruct dispenser controller 224 to initiate dispensing of liquid 124 (e.g., dispense=1). At state 706, processor 216 may also determine whether event 716 or event 714 has occurred. For example, event 716 may be determined to occur when the fill level is greater than predetermined threshold D. The fill level may be determined based on the (filtered) variance. For example, the (filtered) variance may be used to determine and monitor the distance (e.g., range) to the liquid level. The distance (e.g., range) to the rim may be determined from the (filtered) magnitude (e.g., in event 710). The distance between rim and the liquid level (e.g., the range to the liquid level and the range to the rim) may be compared to threshold D, to determine when to stop filling the cup.

When event 714 is determined to occur, state 706 proceeds to state 702. When event 716 is determined to occur, state 706 proceeds to state 708.

At state 708 (cup full, dispense=0), processor 216 may instruct dispenser controller 224 to stop dispensing of liquid 124 (e.g., dispense=0). At state 706, processor 216 may also determine whether event 714 has occurred. When event 714 occurs, state 708 may proceed to state 702. In this manner, dispensing for a container is complete, and system 200 may wait for a another container to be positioned for touchless automatic dispensing.

While the present disclosure has been discussed in terms of certain embodiments, it should be qualified that the present disclosure is not so limited. The embodiments are explained herein by way of example, but there are numerous modifications, variations and other embodiments that may be employed that would still be within the scope of the present disclosure.

What is claimed:

1. A system for monitoring a moveable surface, the system comprising:
    an ultrasonic transducer positioned on or within a liquid dispensing device;
    a circuit coupled to the ultrasonic transducer, the circuit configured to cause the ultrasonic transducer to transmit a sequence of ultrasonic pulses towards a liquid container and to receive a sequence of reflected signals responsive to the transmitted sequence of ultrasonic pulses, each of the sequence of reflected signals including at least one first reflection from at least one non-movable surface and at least one second reflection from a movable surface, wherein the at least one non-movable surface comprises at least one surface the liquid container, and the movable surface comprises liquid in the liquid container; and
    a digital controller configured to, for each one of the sequence of reflected signals:
        determine a magnitude and a variance of the respective one of the sequence of reflected signals to form at least one output signal;
        identify, in the at least one output signal, at least one first pulse indicative of the at least one non-moveable surface in response to the variance being less than a threshold and at least one second pulse indicative of the moveable surface in response to the variance being greater than the threshold;
        determine a distance of the moveable surface relative to the at least one non- moveable surface based on a difference in the magnitude of the identified at least one first pulse and the magnitude of the identified at least one second pulse; and
        controlling the liquid dispensing device based on the distance.

2. The system of claim 1, wherein the distance of the moveable surface relative to the at least one non-moveable surface is determined based on at least one first time of flight (TOF) indicated by the at least one first pulse and a second TOF indicated by the at least one second pulse.

3. The system of claim 1, wherein the digital controller is configured to identify the at least one second pulse indicative of the moveable surface based on the variance of the respective one of the sequence of reflected signals.

4. The system of claim 1, wherein the digital controller is configured to determine the at least one of the magnitude and the variance based on application of at least one predefined filter.

5. The system of claim 1, wherein the digital controller is configured to identify the at least one first pulse indicative of the at least one non-moveable surface based on the magnitude of the respective one of the sequence of reflected signals.

6. The system of claim 1, wherein the digital controller is configured to determine a stability of the at least one non-moveable surface based on the variance of the respective one of the sequence of reflected signals.

7. The system of claim 1, wherein the system is configured to determine a liquid level of a liquid inside of a container, the moveable surface comprises the liquid level, and the at least one non-moveable surface comprises one or more of a rim of the container and a bottom of the container.

8. The system of claim 7, wherein:
    the system is configured to determine, via the ultrasonic transducer, a background signal when the container is not present within a predetermined detection region, the background signal including a ringdown component, and
    the digital controller is configured to subtract the background signal from the sequence of reflected signals, to minimize the ringdown component in the sequence of reflected signals.

9. The system of claim 8, wherein the system is configured to periodically determine the background signal.

10. The system of claim 8, wherein the system is configured to determine one or more of the background signal and a presence of the container at a first sample rate, and to utilize a second sample rate for the received sequence of reflected signals, the first sample rate being lower than the second sample rate.

11. The system of claim 7, wherein, prior to transmitting the sequence of ultrasonic pulses, the system is configured to detect, via the ultrasonic transducer, a presence of the container within a predetermined detection region, and to cause a dispenser to initiate dispensing of the liquid into the container responsive to the detection of the container.

12. The system of claim 11, wherein the digital controller is configured to monitor the liquid level based on the determined distance, and to cause the dispenser to stop dispensing the liquid when the determined distance is within a predetermined threshold relative to the rim of the container.

13. A method for monitoring a moveable surface, the method comprising:
    causing, via a circuit coupled to an ultrasonic transducer positioned on or within a liquid dispensing device, the ultrasonic transducer to transmit a sequence of ultrasonic pulses towards a liquid container;
    receiving, via the circuit, a sequence of reflected signals responsive to the transmitted sequence of ultrasonic pulses, each of the sequence of reflected signals including at least one first reflection from at least one non-movable surface and at least one second reflection from a movable surface, wherein the at least one non-movable surface comprises at least one surface the liquid container, and the movable surface comprises liquid in the liquid container; and
    for each one of the sequence of reflected signals:
        determining, via a digital controller, a magnitude and a variance of the respective one of the sequence of reflected signals to form at least one output signal;
        identifying, via the digital controller, in the at least one output signal, at least one first pulse indicative of the at least one non-moveable surface in response to the variance being less than a threshold and at least one second pulse indicative of the moveable surface in response to the variance being greater than the threshold;
        determining, via the digital controller, a distance of the moveable surface relative to the at least one non-moveable surface based on a difference in the magnitude of the identified at least one first pulse and the magnitude of the identified at least one second pulse; and
        controlling the liquid dispensing device based on the distance.

14. The method of claim 13, wherein the distance of the moveable surface relative to the at least one non-moveable surface is determined based on at least one first time of flight (TOF) indicated by the at least one first pulse and a second TOF indicated by the at least one second pulse.

15. The method of claim 13, wherein the identifying of the at least one first pulse and the at least one second pulse further comprises:
    identifying the at least one second pulse indicative of the moveable surface based on the variance of the respective one of the sequence of reflected signals.

16. The method of claim 13, wherein the determining of the at least one of the magnitude and the variance includes application of at least one predefined filter.

17. The method of claim 13, wherein the identifying of the at least one first pulse and the at least one second pulse further comprises:
    identifying the at least one first pulse indicative of the at least one non-moveable surface based on the magnitude of the respective one of the sequence of reflected signals.

18. The method of claim 13, wherein the identifying of the at least one first pulse and the at least one second pulse further comprises:
    determining a stability of the at least one non-moveable surface based on the variance of the respective one of the sequence of reflected signals.

19. The method of claim 13, wherein the moveable surface comprises a liquid level of a liquid, the at least one non-moveable surface comprises one or more of a rim of a container and a bottom of the container, the container is configured to contain the liquid, and the determining of the distance of the moveable surface relative to the at least one non-moveable surface comprises determining the liquid level of the liquid inside of the container.

20. The method of claim 19, the method further comprising:
    determining, via the ultrasonic transducer, a background signal when the container is not present within a predetermined detection region, the background signal including a ringdown component, and
    subtracting, via the digital controller, the background signal from the sequence of reflected signals, to minimize the ringdown component in the sequence of reflected signals.

21. The method of claim 20, the method further comprising periodically determining the background signal.

22. The method of claim 20, the method further comprising:
    determining one or more of the background signal and a presence of the container at a first sample rate; and
    utilizing a second sample rate for the received sequence of reflected signals, the first sample rate being lower than the second sample rate.

23. The method of claim 19, the method further comprising, prior to transmitting the sequence of ultrasonic pulses:
    detecting, via the ultrasonic transducer, a presence of the container within a predetermined detection region; and
    causing a dispenser to initiate dispensing of the liquid into the container responsive to the detection of the container.

24. The method of claim 23, the method further comprising:
    monitoring, via the digital controller, the liquid level based on the determined distance; and
    causing the dispenser to stop dispensing the liquid when the determined distance is within a predetermined threshold relative to the rim of the container.

25. An apparatus for dispensing a liquid in a container, the apparatus comprising:
    a dispenser configured to dispense a liquid into a container;
    at least one time of flight (TOF) sensor;
    a circuit coupled to the at least one TOF sensor, the circuit configured to cause the at least one TOF sensor to transmit a sequence of pulses and to receive a sequence of reflected signals, each of the sequence of reflected signals including at least one first reflection and at least one second reflection, the at least one first reflection associated with a portion of the container, the at least one second reflection associated with a liquid level of the liquid dispensed into the container, the portion of the container comprising at least one of a rim and a bottom surface; and a digital controller configured to, for each one of the sequence of reflected signals:

determine a magnitude and a variance of the respective one of the sequence of reflected signals to form at least one output signal;

identify, in the at least one output signal, at least one first pulse indicative of the portion of the container in response to the variance being less than a threshold and at least one second pulse indicative of the liquid level in response to the variance being greater than the threshold; and determine a distance of the liquid level relative to the portion of the container based on a difference in the magnitude of the identified at least one first pulse and the magnitude of the identified at least one second pulse, and the digital controller configured to monitor a change in the liquid level based on the determined distance over the sequence of reflected signals to control dispensing of the liquid via the dispenser.

26. The apparatus of claim 25, wherein the digital controller is configured to cause the dispenser to stop dispensing the liquid when the determined distance is within a predetermined threshold relative to the rim of the container.

27. The apparatus of claim 25, wherein, prior to transmitting the sequence of pulses, the digital controller is configured to detect, via the at least one TOF sensor, a presence of the container within a predetermined detection region, and to cause the dispenser to initiate dispensing of the liquid into the container responsive to the detection of the container.

28. The apparatus of claim 25, wherein:

the digital controller is configured to determine, via the at least one TOF sensor, a background signal when the container is not present within a predetermined detection region, the background signal including a ringdown component, and the digital controller is configured to subtract the background signal from the sequence of reflected signals, to minimize the ringdown component in the sequence of reflected signals.

29. The apparatus of claim 25, wherein the digital controller is configured to identify the at least one second pulse indicative of the change of the liquid level based on the variance of the respective one of the sequence of reflected signals.

30. The apparatus of claim 25, wherein the digital controller is configured to at least one of:

identify the at least one first pulse indicative of the portion of the container based on the magnitude of the respective one of the sequence of reflected signals, and determine a stability of the container based on the variance of the respective one of the sequence of reflected signals.

31. The apparatus of claim 25, wherein the at least one TOF sensor comprises at least one of an ultrasonic sensor, a radar sensor and an optical sensor.

\* \* \* \* \*